US008623555B2

(12) United States Patent
Kang et al.

(10) Patent No.: US 8,623,555 B2
(45) Date of Patent: Jan. 7, 2014

(54) ELECTRODE USEABLE IN ELECTROCHEMICAL CELL AND METHOD OF MAKING SAME

(75) Inventors: Weng Poo Kang, Nashville, TN (US); Supil Raina, Nashville, TN (US); Shao-Hua Hsu, Nashville, TN (US); Siyu Wei, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 0 days.

(21) Appl. No.: 13/480,860

(22) Filed: May 25, 2012

(65) Prior Publication Data

US 2012/0301781 A1    Nov. 29, 2012

Related U.S. Application Data

(60) Provisional application No. 61/491,096, filed on May 27, 2011.

(51) Int. Cl.
*H01M 4/66* (2006.01)
(52) U.S. Cl.
USPC .... 429/245; 429/231.3; 429/221; 429/231.95
(58) Field of Classification Search
None
See application file for complete search history.

(56) References Cited

U.S. PATENT DOCUMENTS

| | | | |
|---|---|---|---|
| 2007/0015336 A1* | 1/2007 | Farahmandi et al. | 438/396 |
| 2010/0255356 A1* | 10/2010 | Fujii et al. | 429/94 |
| 2012/0141864 A1* | 6/2012 | Juzkow et al. | 429/163 |
| 2012/0219852 A1* | 8/2012 | Huang et al. | 429/199 |

OTHER PUBLICATIONS

S. Wei et al., Supercapacitor Behavior of CNT/MnO2 Composite, ECS Transactions, 28 (8), 97-103 (2010).
J.-M. Tarascon et al., Issues and challenges facing rechargeable lithium batteries, Nature, 414, 359-367 (2001).
A. Manthiram, Materials Challenges and Opportunities of Lithium Ion Batteries, J. Phys. Chem. Lett., 2, 176-184 (2011).
R. Dominko et al., Structure and electrochemical performance of Li2MnSiO4 and Li2FeSiO4 as potential Li-battery cathode materials, Electrochem. Comm., 8, 217-222 (2006).
M.E. Arroyo-deDompablo et al., On the Energetic Stability and Electrochemistry of Li2MnSiO4 Polymorphs, Chem. Mater., 20, 5574-5584 (2008).
T. Muraliganth et al., Microwave-Solvothermal Synthesis of Nanostructured Li2MSiO4/C (M = Mn and Fe) Cathodes for Lithium-Ion Batteries, Chem. Mater., 22, 5754-5761 (2010).
A. Kokalj et al., Beyond One-Electron Reaction in Li Cathode Materials: Designing Li2MnxFe1-xSiO4, Chem. Mater., 19, 3633-3640 (2007).
R. Dominko, Li2MSiO4 (M = Fe and/or Mn) cathode materials, J. of Power Sources, 184, 462-468 (2008).
A. Nyten et al., Electrochemical performance of Li2FeSiO4 as a new Li-battery cathode material, Electrochem. Comm., 7, 156-160 (2005).
C. Lyness et al., The lithium intercalation compound Li2CoSiO4 and its behaviour as a positive electrode for lithium batteries, Chem. Commum., 4890-4892 (2007).

* cited by examiner

*Primary Examiner* — Milton I Cano
*Assistant Examiner* — Carmen Lyles-Irving
(74) *Attorney, Agent, or Firm* — Tim Tingkang Xia, Esq.; Morris Manning & Martin, LLP

(57) ABSTRACT

In one aspect of the present invention, an electrode useable in an electrochemical cell includes an electrically conductive substrate, nanostructured current collectors in electrical contact with the conductive substrate, and nanoparticles of a ternary orthosilicate composite coated on the nanostructured current collectors. The ternary orthosilicate composite comprises $Li_2Mn_xFe_yCo_zSiO_4$, where $x+y+z=1$.

16 Claims, 17 Drawing Sheets

ELECTRODE USEABLE IN ELECTROCHEMICAL CELL AND METHOD OF MAKING SAME

CROSS-REFERENCE TO RELATED PATENT APPLICATIONS

This application claims priority to and the benefit of, pursuant to 35 U.S.C. §119(e), U.S. provisional patent application Ser. No. 61/491,096, filed May 27, 2011, entitled "LITHIUM-ION BATTERY CATHODE COMPRISING TERNARY COMPOSITE OF NANOSTRUCTURED MATERIALS AND METHODS OF MAKING SAME," by Weng Poo Kang, Siyu Wei and Supil Raina, the disclosure of which is incorporated herein in its entirety by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [1] represents the 1st reference cited in the reference list, namely, S. Wei, W. P. Kang, J. L. Davidson, B. R. Rogers, and J. H. Huang, ECS Transactions 28, 97 (2010).

STATEMENT AS TO RIGHTS UNDER FEDERALLY-SPONSORED RESEARCH

This invention was made with government support under Contract No. N00014-11-M-0315 awarded by the Office of Navy Research of the United States. The government has certain rights in the invention.

FIELD OF THE INVENTION

The present invention relates generally to an electrode useable in an electrochemical cell, and more particularly to a battery cathode material including a nano-architecture current collector array in electrical contact with a flexible (or rigid) conducting foil and coated with a high-performance active layer of ternary orthosilicate compound, and methods of manufacturing and applications of the same.

BACKGROUND OF THE INVENTION

Currently, a lithium-ion battery (LIB) is one of the most promising battery technologies that can provide higher energy density than other batteries. It also does not suffer from the memory effect and the loss of charge is relatively slow when not in use. Hence, high-performance LIB remains the preferred technology that would address a much broader range of energy source/storage for a variety of applications if advanced cathode material with extreme operating capability could be realized.

Current lithium ion batteries mostly utilize metal oxides as cathode material with $LiCoO_2$ as the most popular and commercially successful representative [2]. However, due to the intrinsic material properties of these metal oxides, further enhancement of LIB performance is limited. Specifically, the metal oxides have limited average potential versus $Li/Li^+$, mostly well below 4V except $LiMn_2O_4$, and most of the metal oxides have the specific capacity well below 180 mAh/g, with the exception of $LiNiO_2$. The metal oxides are also "hot" cathode materials due to the thermal runaway reaction, so there is also a concern for safety.

Another major group of cathode materials is $LiMPO_4$, where M=Co, Ni, Mn, or Fe. These materials have the electrode potential in the range of about 3.5-5.2 V, but the capacity is still limited below 150-170 mAh/g [3]. Further, these materials have poor electrical conductivity, so they have to be made in the form of tiny nanoparticles and coated with a carbon layer, which increases the cost of the materials.

The $Li_2MSiO_4$ silicate family (where M=Co, Fe, or Mn) has attracted research activities for the applications in LIB only recently [4, 5] and much work needs to be done to thoroughly understand its properties. The most significant advantage of this group of materials is the polyanionic structure with two lithium ions per formula unit. The theoretical capacity of these materials is as high as about 330 mAh/g. Unfortunately, Co is an expensive metal despite its high average voltage of about 4.3 V. Therefore, pure $Li_2CoSiO_4$ is not an efficient and economic way for making a cathode. $Li_2FeSiO_4$ has good cycle-ability, but the average voltage is only about 3.1 V, far below 4 V. On the contrary, Mn is an inexpensive and abundant element. The average voltage of $Li_2MnSiO_4$ is about 4.2 V. The reported specific capacity of $Li_2MnSiO_4$ is about 210 and about 250 mAh/g at room temperature and 55° C., respectively [6]. However, it has to be noted that the entire family of $Li_2MSiO_4$ silicates has poor electrical conductivity, therefore $Li_2MnSiO_4$ has to be made into nanoparticles and coated with carbon in order to improve the conductivity, similar to the aforementioned $LiMPO_4$. The additional carbon-coating process is expensive.

Another major drawback of $Li_2MnSiO_4$ is its poor cycle life characterized by the poor capacity retention and rate performance. A recent report shows a 50% retained capacity at room temperature after 20 cycles. The poor cycling performance is mainly attributed to Jahn-Teller distortion, structural instability and low electronic conductivity of the material. Another possible attribution is the electrolyte degradation.

The presence of $Mn^{3+}$ ions in the material system is responsible for the dynamic Jahn-Teller distortion and manganese dissolution, a situation similar to that of $LiMn_2O_4$ spinel cathode. Also, the structure of $Li_2MnSiO_4$ is prone to collapsing upon delithiation. During delithiation, a phase separation into $MnSiO_4$ and $Li_2MnSiO_4$ may occur, leading to the formation of an amorphous structure, which in turn results in the drop of reversible capacity of the electrode during the cycling.

An effective way to minimize the dynamic Jahn-Teller distortion and prevent the collapse of $Li_2MnSiO_4$ structure is the utilization of a solid solution of $Li_2MnSiO_4$ and $Li_2FeSiO_4$ as the cathode. However, there is very limited research available on this topic. A few literature reports do show that addition of $Li_2FeSiO_4$ has prevented $Li_2MnSiO_4$ from collapsing during delithiation [7, 8]. Nonetheless, according to the reports, the cyclic reversibility is still unacceptable.

Therefore, a heretofore unaddressed need exists in the art to address the aforementioned deficiencies and inadequacies.

SUMMARY OF THE INVENTION

In one aspect, the present invention relates to an electrode useable in an electrochemical cell. In one embodiment, the electrode has an electrically conductive substrate, carbon nanotubes (CNTs) in electrical contact with the conductive substrate, and nanoparticles of a $Li_2Mn_xFe_yCo_zSiO_4$ composite coated on the CNTs, where $x+y+z=1$.

The conductive substrate includes a thin film formed of an electrically conductive material, where the thin film is flexible (or rigid). In one embodiment, the conductive material comprises a metal, an alloy, a polymer, graphite, or a conducting oxide.

In one embodiment, the CNTs have tube diameters in a range of about 1.0-1,000.0 nm and height in micrometer range. The nanoparticles of the $Li_2Mn_xFe_yCo_zSiO_4$ composite have diameters or sizes in a range of about 1.0-1000.0 nm.

Additionally, the electrode further has an electrolyte solution filled in spaces among the CNTs and the nanoparticles of the $Li_2Mn_xFe_yCo_zSiO_4$ composite.

In another aspect, the present invention relates to an electrode useable in an electrochemical cell. In one embodiment, the electrode has an electrically conductive substrate, nanostructured current collectors formed on the conductive substrate, and nanoparticles of a ternary orthosilicate composite coated on the nanostructured current collectors.

The conductive substrate includes a thin film formed of an electrically conductive material, where the thin film is flexible (or rigid). In one embodiment, the conductive material comprises a metal, an alloy, a polymer, graphite, or a conducting oxide.

The nanostructured current collectors in one embodiment comprise conductive nanotubes/fibers in electrical contact with the conductive substrate. In one embodiment, the conductive nanotubes/fibers include carbon nanotubes (CNTs) or carbon fibers/nanofibers (CFs).

The ternary orthosilicate composite comprises $Li_2Mn_xFe_yCo_zSiO_4$, where $x+y+z=1$.

Further, the electrode may also have an electrolyte solution filled in spaces among the nanostructured current collectors and the nanoparticles of the active material.

In yet another aspect, the present invention relates to an electrochemical cell comprising the electrode as disclosed above.

In a further aspect, the present invention relates to a method of making an electrode useable in an electrochemical cell. In one embodiment, the method includes the steps of providing an electrically conductive substrate, forming nanostructured current collectors on the conductive substrate, and attaching (or coating) nanoparticles of a ternary orthosilicate composite to the nanostructured current collectors.

The method may further include the step of filling an electrolyte solution in spaces among the nanostructured current collectors and the nanoparticles of the active material The conductive substrate comprises a thin film formed of an electrically conductive material. In one embodiment, the thin film is flexible (or rigid).

In one embodiment, the nanostructured current collectors comprise conductive nanotubes/fibers. The conductive nanotubes/fibers in one embodiment include carbon nanotubes (CNTs) or carbon fibers/nanofibers (CFs).

In one embodiment, the forming step comprises synthesizing or growing the conductive nanotubes/fibers, such as CNTs or CFs or other types of conductive nanotubes/fibers on the conductive substrate.

In one embodiment, the ternary orthosilicate composite comprises $Li_2Mn_xFe_yCo_zSiO_4$, where $x+y+z=1$.

In one embodiment, the ternary orthosilicate composite is synthesized by a hydrothermal process comprising the steps of mixing starting precursors of lithium hydroxide, $SiO_2$ particles, Fe(II) chloride tetrahydrate, manganese chloride, and cobalt chloride, in a predetermined composition ratio to form a mixture, sealing the mixture under an Ar (or inert) environment and baking the sealed mixture at a predetermined temperature for a period of time to form $Li_2Mn_xFe_yCo_zSiO_4$ compound, rinsing the $Li_2Mn_xFe_yCo_zSiO_4$ compound with de-ionized (DI) water, drying rinsed $Li_2Mn_xFe_yCo_zSiO_4$ compound in vacuum, ball-milling the dried $Li_2Mn_xFe_yCo_zSiO_4$ compound into nanoparticles, and calcining the $Li_2Mn_xFe_yCo_zSiO_4$ powders in an inert or reducing environment.

In another embodiment, the ternary orthosilicate compound is synthesized by Pechini process comprising the steps of dispersing lithium acetate, $SiO_2$ particles, citric acid, and ethylene glycol at a first predetermined composition ratio in de-ionized (DI) water to form a first mixture, wherein the mixture is sonicated for a period of time, adding Fe(III) citrate, manganese acetate, and cobalt carbonate at a second predetermined composition ratio into the first mixture to form a second mixture, stirring and dwelling the second mixture at a reflux station to form a $Li_2Mn_xFe_yCo_zSiO_4$ gel, drying the $Li_2Mn_xFe_yCo_zSiO_4$ gel, grinding the $Li_2Mn_xFe_yCo_zSiO_4$ into nanoparticles, and calcining the $Li_2Mn_xFe_yCo_zSiO_4$ powders in an inert or reducing environment.

In another embodiment, the ternary orthosilicate compound is synthesized by a sol-gel process comprising the steps of dispersing lithium acetate, iron citrate, manganese acetate, and cobalt carbonate at a first predetermined composition ratio in de-ionized (DI) water to form a first mixture, adding citric acid to the first mixture to form a second mixture, adding tetraethylorthosilicate (TEOS) and ethanol at a second predetermined composition ratio to form third mixture, stirring and dwelling the third mixture at a reflux station to form a $Li_2Mn_xFe_yCo_zSiO_4$ gel, drying the $Li_2Mn_xFe_yCo_zSiO_4$ gel to form a $Li_2Mn_xFe_yCo_zSiO_4$ compound, grinding the $Li_2Mn_xFe_yCo_zSiO_4$ compound into nanoparticles, and calcining the $Li_2Mn_xFe_yCo_zSiO_4$ powders in an inert or reducing environment.

In one embodiment, the attaching (or coating) step is performed by a dripping/wetting process comprising the steps of preparing a suspension of the nano-particles of the ternary orthosilicate composite in a liquid medium, dripping the suspension into the nanostructured current collectors in electrical contact with the conductive substrate, and drying the suspension to attach (or coat) the nano-particles of the ternary orthosilicate composite onto the nanostructured current collectors. The liquid medium comprises acetone, water or other liquid media.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1A:
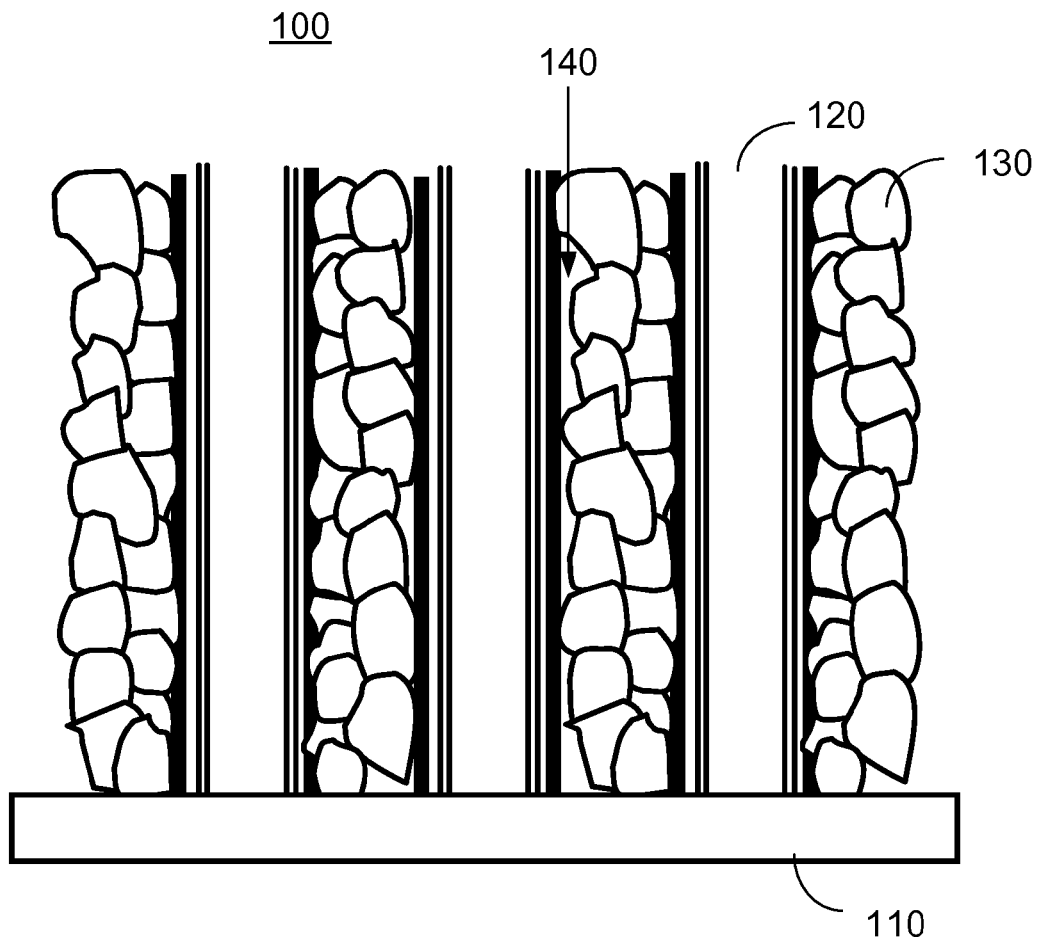
FIG. 1A shows schematically a cross-sectional view of a lithium-ion battery cathode according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

DEFINITIONS

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, if any, the term "scanning electron microscope" or its abbreviation "SEM" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, if any, the term "energy-dispersive X-ray spectroscopy" or its abbreviation "EDS" refers to an analytical technique used for the elemental analysis or chemical characterization of a sample. It relies on the investigation of an interaction of some source of X-ray excitation and a sample. Its characterization capabilities are due in large part to the fundamental principle that each element has a unique atomic structure allowing unique set of peaks on its X-ray spectrum.

As used herein, if any, the term "X-ray diffraction" or its abbreviation "XRD" refers to a method of determining the arrangement of atoms within a crystal or solid, in which a beam of X-rays strikes a crystal and diffracts into many specific directions. From the angles and intensities of these diffracted beams, a crystallographer can produce a three-dimensional picture of the density of electrons within the crystal. From this electron density, the mean positions of the atoms in the crystal can be determined, as well as their chemical bonds, their disorder and various other information. In an X-ray diffraction measurement, a crystal or solid sample is mounted on a goniometer and gradually rotated while being bombarded with X-rays, producing a diffraction pattern of regularly spaced spots known as reflections. The two-dimensional images taken at different rotations are converted into a three-dimensional model of the density of electrons within the crystal using the mathematical method of Fourier transforms, combined with chemical data known for the sample.

As used herein, if any, the term "differential scanning calorimetry" or its abbreviation "DSC" refers to a thermoanalytical technique in which the difference in the amount of heat required to increase the temperature of a sample and reference is measured as a function of temperature. Both the sample and reference are maintained at nearly the same temperature throughout the experiment. Generally, the temperature program for a DSC analysis is designed such that the sample holder temperature increases linearly as a function of time. The reference sample should have a well-defined heat capacity over the range of temperatures to be scanned.

As used herein, "nanoscopic-scale", "nanoscopic", "nanometer-scale", "nanoscale", "nanocomposites", "nanoparticles", the "nano-" prefix, and the like generally refers to elements or articles having widths or diameters of less than about 1 µm, preferably less than about 100 nm in some cases. In all embodiments, specified widths can be smallest width (i.e. a width as specified where, at that location, the article can have a larger width in a different dimension), or largest width (i.e. where, at that location, the article's width is no wider than as specified, but can have a length that is greater).

As used herein, a "nanostructure" refers to an object of intermediate size between molecular and microscopic (micrometer-sized) structures. In describing nanostructures, the sizes of the nanostructures refer to the number of dimensions on the nanoscale. For example, nanotextured surfaces have one dimension on the nanoscale, i.e., only the thickness of the surface of an object is between 1.0 and 1000.0 nm. Nanotubes have two dimensions on the nanoscale, i.e., the diameter of the tube is between 1.0 and 1000.0 nm; its length could be much greater. Finally, sphere-like nanoparticles have three dimensions on the nanoscale, i.e., the particle is between 1.0 and 1000.0 nm in each spatial dimension. A list of nanostructures includes, but not limited to, nanoparticle, nanocomposite, quantum dot, nanofilm, nanoshell, nanofiber, nanoring, nanorod, nanowire, nanotube, and so on.

As used herein, "plurality" means two or more.

As used herein, the terms "comprising", "including", "carrying", "having", "containing", "involving", and the like are to be understood to be open-ended, i.e., to mean including but not limited to.

OVERVIEW OF THE INVENTION

The present invention relates to electrodes useable in an electrochemical cell, methods of making the same, and applications of the same. In one embodiment, the electrochemical cell is corresponding to a battery, and the electrode is utilized for a lithium-ion battery cathode and includes a composite of nanostructured materials.

In one aspect of the present invention, an electrode usable for a battery cathode has an electrically conductive substrate, nanostructured current collectors in electrical contact with the conductive substrate, and nanoparticles of a ternary orthosilicate composite coated on the nanostructured current collectors. The conductive substrate includes a thin film formed of an electrically conductive material. Preferably, the thin film is flexible. The conductive material includes a metal, an alloy, a polymer, graphite, or a conducting oxide. The nanostructured current collectors include CNTs or carbon fibers/nanofibers (CFs), where the CNTs or CFs are in electrical contact with the conductive substrate. The ternary orthosilicate composite includes $Li_2Mn_xFe_yCo_zSiO_4$, where $x+y+z=1$. The CNTs have diameters or thicknesses in a range of about 1.0-1,000.0 nm. The nanoparticles of the $Li_2Mn_xFe_yCo_zSiO_4$ composite have diameters or sizes in a range of about 1.0-1000.0 nm.

In addition, the electrode further includes an electrolyte solution filled in spaces among the CNTs and the nanoparticles of the $Li_2Mn_xFe_yCo_zSiO_4$ composite.

In one embodiment, CNTs are utilized as an array of nano-architecture current collectors formed directly on a conductive substrate, which can be a flexible (or rigid) conducting foil (e.g. metal, graphite). Vertical-aligned CNTs impregnated with $MnO_2$ nano-particles as electrodes [1] have been used for electrochemical supercapacitors recently, which resulted in excellent performance of about 1,000 F/cm$^3$. In the present invention, the material coated on the CNT array is a high-performance active layer of ternary orthosilicate compound with composition of $Li_2Mn_xFe_yCo_zSiO_4$, where $x+y+z=1$. The electrode using such nanostructured CNTs provides a high surface area of attachment for $Li_2Mn_xFe_yCo_zSiO_4$ nanoparticles, which minimizes the contact resistance at the active material/current collector interface, and thereby maximizes the charge efficiency and the energy density of the cathode.

The electrode of the present invention is a high-voltage, high-capacity, and inexpensive cathode for lithium-ion batteries (LIBs) capable of supporting high transient and pulsed loads while offering enhanced safety and lifecycle performance. Currently LIB is one of the most promising battery technologies that can provide higher energy density than other battery technologies. It also does not suffer from the memory effect and the loss of charge is relatively slow when not in use. Hence, with the electrode of the present invention, high-performance LIB can be realized to address a much broader range of energy source/storage for both military and civil applications.

$Li_2MSiO_4$, where M=Mn, Fe, and/or Co, is similar to olivine phosphate ($LiFePO_4$) and has low electron conductivity. Fabrication processes of the LIB cathode structures utilizing such materials usually involve making the active material in the form of tiny nanoparticles, mixing them with carbon or coating them with a conductive carbon layer, and then pasting the mixture onto a conductive substrate (e.g., an aluminum foil) with a binder material. However, the electron conductivity of the mixture is limited by the high resistivity of the binder material and the high ohmic contact resistance between the cathode material and the substrate. In addition, the heat transfer between the cathode material and the substrate is also less than optimal, leading to elevated cathode temperature under heavy load.

Accordingly, the present invention utilizes a ternary orthosilicate composite, such as the $Li_2Mn_xFe_yCo_zSiO_4$ composite, for the cathode active material, which would lead to a cathode with high voltage ($\geq 4V$), high capacity ($\geq 180$ mAh/g), excellent cycle life, and low cost. To achieve the present invention, synthesis of high performance ternary orthosilicate composite of $Li_2Mn_xFe_yCo_zSiO_4$ must be realized such that the $Li_2Mn_xFe_yCo_zSiO_4$ composite can be attached to the CNTs structure. Thus, the cathode obtained would have enhanced specific area and minimized interface resistance, thereby maximizing the charge transfer efficiency and specific power-energy densities.

In a further aspect of the present invention, a method of making a cathode useable in a battery includes the steps of providing an electrically conductive substrate, forming nanostructured current collectors on the conductive substrate, and attaching nanoparticles of a ternary orthosilicate composite to the nanostructured current collectors.

In one embodiment, the ternary orthosilicate composite is synthesized by a hydrothermal process comprising the steps of mixing starting precursors of lithium hydroxide, $SiO_2$ particles, Fe(II) chloride tetrahydrate, manganese chloride, and cobalt chloride, in a predetermined composition ratio to form a mixture, sealing the mixture under an Ar environment and baking the sealed mixture at a predetermined temperature for a period of time to form $Li_2Mn_xFe_yCo_zSiO_4$ compound, rinsing the $Li_2Mn_xFe_yCo_zSiO_4$ compound with de-ionized (DI) water, drying rinsed $Li_2Mn_xFe_yCo_zSiO_4$ compound in vacuum, ball-milling the dried $Li_2Mn_xFe_yCo_zSiO_4$ powders into nanoparticles, and calcining the $Li_2Mn_xFe_yCo_zSiO_4$ powders in an inert or reducing environment.

In another embodiment, the ternary orthosilicate composite is synthesized by a Pechini process comprising the steps of dispersing lithium acetate, $SiO_2$ particles, citric acid, and ethylene glycol at a first predetermined composition ratio in de-ionized (DI) water to form a first mixture, wherein the mixture is sonicated for a period of time, adding Fe(III) citrate, manganese acetate, and cobalt carbonate at a second predetermined composition ratio into the first mixture to form a second mixture, stirring and dwelling the second mixture to form a $Li_2Mn_xFe_yCo_zSiO_4$ gel, drying the $Li_2Mn_xFe_yCo_zSiO_4$ gel, grinding the $Li_2Mn_xFe_yCo_zSiO_4$ compound into nanoparticles, and calcining the $Li_2Mn_xFe_yCo_zSiO_4$ powders in an inert or reducing environment.

In another embodiment, the ternary orthosilicate compound is synthesized by a sol-gel process comprising the steps of dispersing lithium acetate, iron citrate, manganese acetate, and cobalt carbonate at a first predetermined composition ratio in de-ionized (DI) water to form a first mixture, adding citric acid to the first mixture to form a second mixture, adding tetraethylorthosilicate (TEOS) and ethanol at a second predetermined composition ratio to form third mixture, stirring and dwelling the third mixture at a reflux station to form a $Li_2Mn_xFe_yCo_zSiO_4$ gel, drying the $Li_2Mn_xFe_yCo_zSiO_4$ gel, grinding the $Li_2Mn_xFe_yCo_zSiO_4$ into nanoparticles, and calcining the $Li_2Mn_xFe_yCo_zSiO_4$ powders in an inert or reducing environment.

The attaching step, in one embodiment, is performed by a dripping/wetting process comprising the steps of preparing a suspension of the nano-particles of the ternary orthosilicate composite in a liquid medium, dripping the suspension into the nanostructured current collectors in electrical contact with the conductive substrate, and drying the suspension to attach the nano-particles of the ternary orthosilicate composite onto the nanostructured current collectors. The liquid medium comprises acetone, water or other liquid media.

The present invention in one aspect also relates to a battery comprising the cathode as disclosed above.

These and other aspects of the present invention are more specifically described below.

IMPLEMENTATIONS AND EXAMPLES OF THE INVENTION

Without intent to limit the scope of the invention, exemplary methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action. It should be appreciated that while these techniques are exemplary of preferred embodiments for the practice of the invention, those of skill in the art, in light of the present disclosure, will recognize that numerous modifications can be made without departing from the spirit and intended scope of the invention.

Example One

The Cathode Structure and Method of Making the Same

FIG. 1A shows schematically a cross-sectional view of a lithium-ion battery cathode according to one embodiment of the present invention. In FIG. 1A, the cathode 100 is a novel CNT-based cathode structure, which includes an electrically conductive substrate 110, single walled or multi-walled CNTs 120 in electrical contact with the conductive substrate 110, and nanoparticles 130 of an $Li_2Mn_xFe_yCo_zSiO_4$ composite attached to the CNTs 120.

In one embodiment, the cathode 100 further includes an electrolyte solution 140 filled in spaces among the CNTs 120 and the nanoparticles 130 of the $Li_2Mn_xFe_yCo_zSiO_4$ composite.

In one embodiment, the conductive substrate 110 can be a flexible (or rigid) thin film formed of an electrically conductive material, such as a metal, an alloy, a polymer, graphite, or a conducting oxide. For example, the conductive substrate 110 can be a flexible (or rigid) thin film aluminum or graphite foil.

Figure 1B:
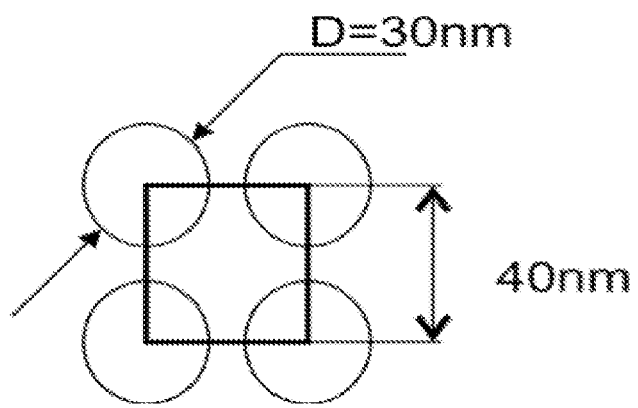
FIG. 1B shows schematically a cross-sectional view of the vertical-aligned CNTs according to one embodiment of the present invention.
Figure 1C:
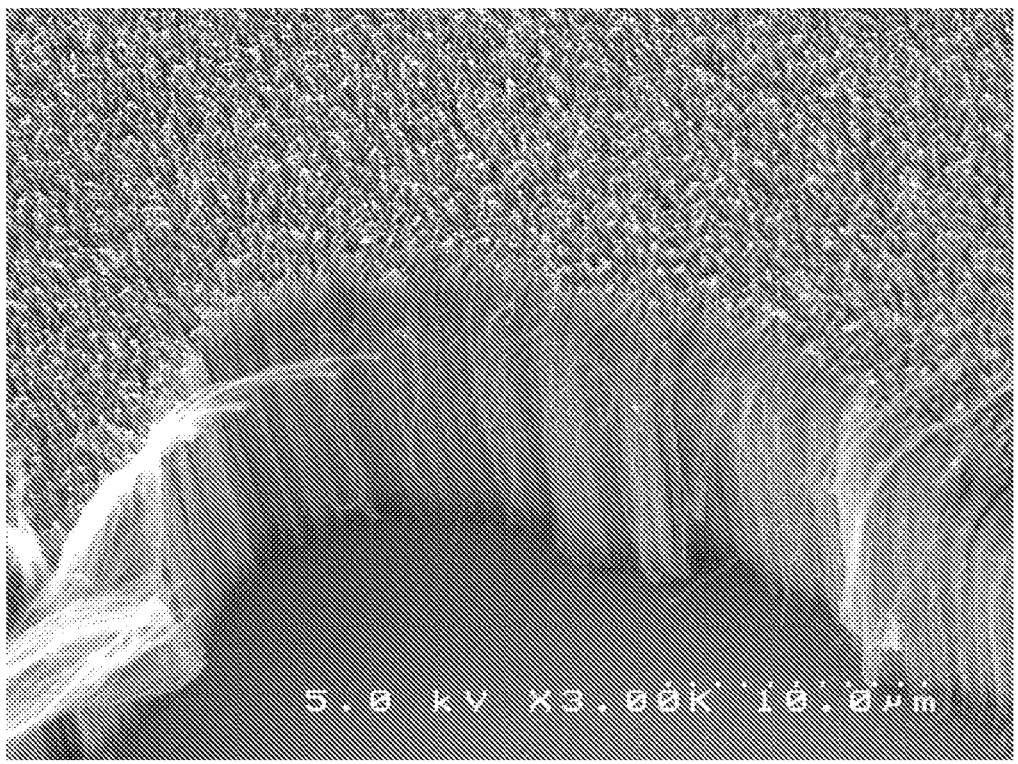
FIG. 1C shows a scanning electron microscope (SEM) diagram of vertical-aligned CNTs according to one embodiment of the present invention.
Figure 1D:
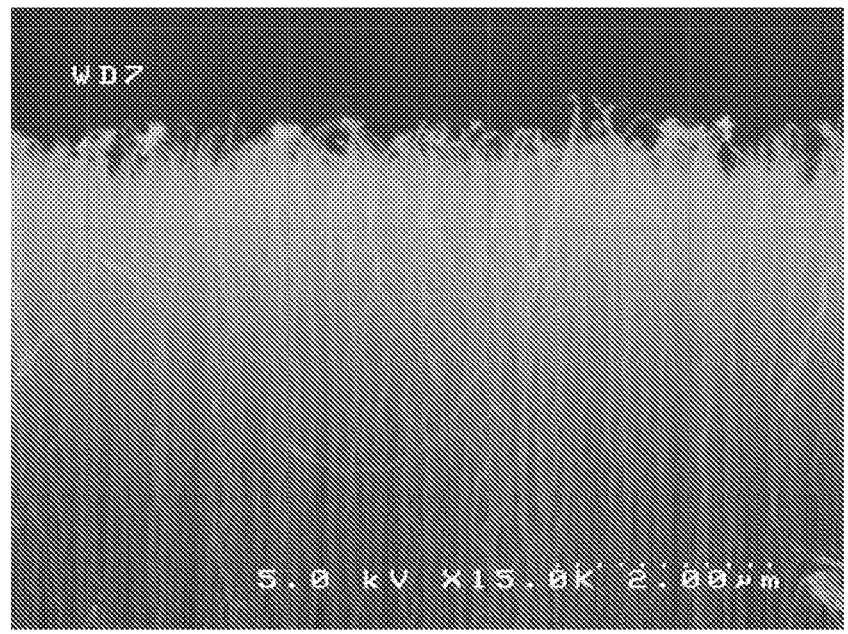
FIG. 1D shows an SEM image of a side view of the vertical-aligned CNTs according to one embodiment of the present invention.

The CNTs 120 serve as nanostructured current collectors of the cathode. In one embodiment, the CNTs 120 are grown directly on the conductive substrate 110. The direct growth of the CNTs 120 on the conductive substrate 110 provides strong chemical bonding at the interface between the CNTs 120 and the conductive substrate 110 such that the contact resistance is minimized. In one embodiment, the CNTs 120 have diameters or thicknesses in a range of about 1.0-1,000.0 nm. For example, FIG. 1B shows schematically a cross-sectional view of the CNTs according to one embodiment of the present invention. As shown in FIG. 1B, the CNTs 120 have diameters of about 30 nm, and the distance between adjacent CNTs 120 is about 40 nm. FIGS. 1C and 1D show scanning electron microscope (SEM) images of vertical-aligned CNTs according to one embodiment of the present invention.

Figure 1E:
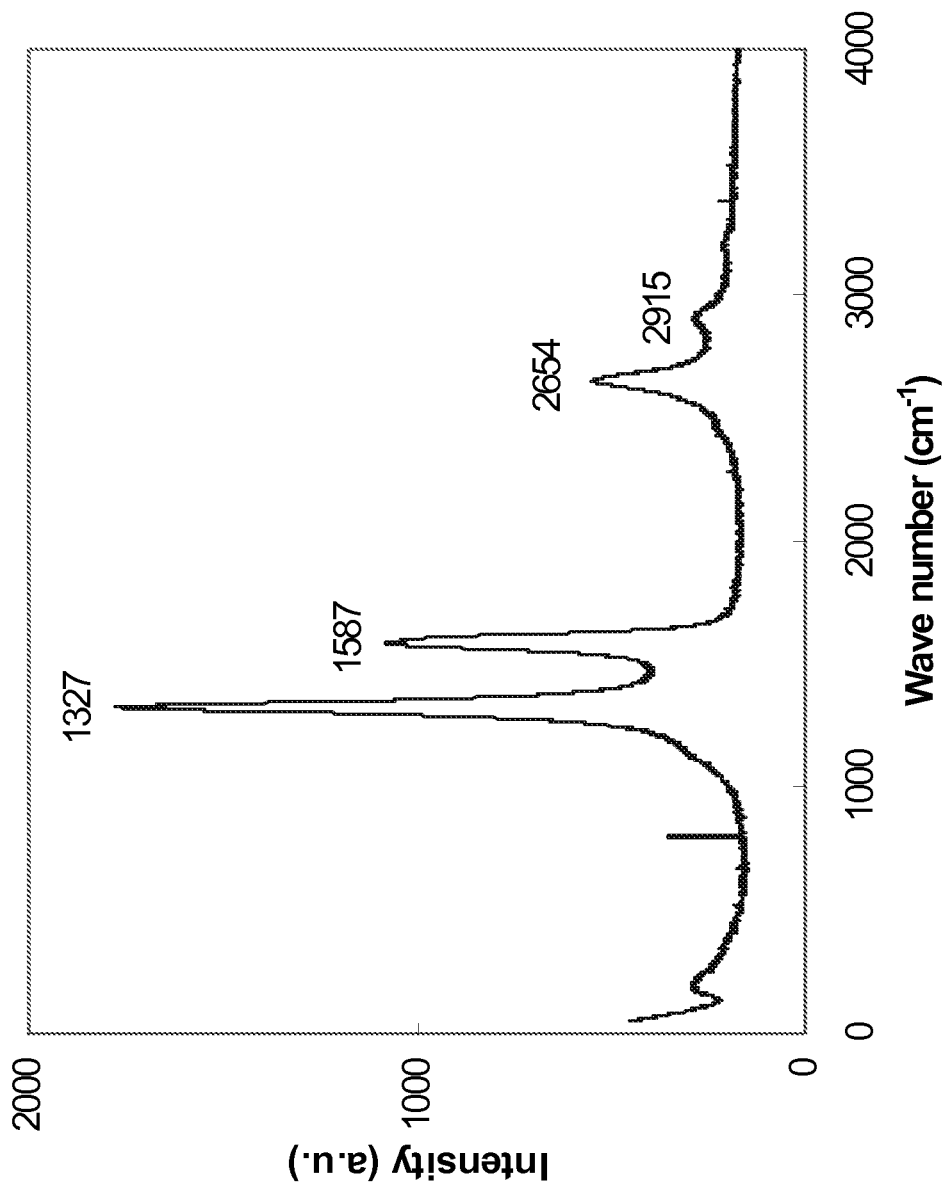
FIG. 1E shows a Raman spectroscopy diagram of vertical-aligned, multi-walled conductive CNTs according to one embodiment of the present invention.

The CNTs, particularly multi-walled CNTs, are highly conductive. FIG. 1E shows a Raman spectroscopy diagram of vertical-aligned, multi-walled conductive CNTs according to one embodiment of the present invention. As shown in FIG. 1E, the strongest peak at 1327 $cm^{-1}$ corresponds to the D-band in the CNT structures, and the second strongest band at 1587 $cm^{-1}$ corresponds to G-band graphite mode. The other bands located at 2654 and 2915 $cm^{-1}$ are due to the second-order combinations of 2D and D+G, respectively.

The $Li_2Mn_xFe_yCo_zSiO_4$ composite is a ternary orthosilicate composite in the group of $Li_2MSiO_4$, where M=Mn, Fe, or Co. In one embodiment, x+y+z=1. In one embodiment, the nanoparticles 130 of the $Li_2Mn_xFe_yCo_zSiO_4$ composite have diameters or sizes in a range of about 1.0-1,000.0 nm.

As stated above, due to the extremely high surface area of the CNTs 120 (or the nanostructured current collectors), the total surface area of the current collectors of the cathode 100 becomes three-dimensional instead of two-dimensional and increases thousands of times. As a result, both electric charge and heat transfer of the cathode 100 become much more efficient, and capacity and safety against overheating of the cathode 100 are thus improved.

In some embodiments, carbon fibers/nanofibers (CFs) may replace the CNTs as the nanostructured current collectors. The structure and performance of the CFs are similar to those of the CNTs, and detailed description of the CFs is hereafter omitted.

In some embodiments, other type of nanotubes/fibers (such as conductive metal-oxide nanotubes/fiber) may replace the CNTs as the nanostructured current collectors, with the structure and performance similar to those of the CNTs.

Figure 1F:
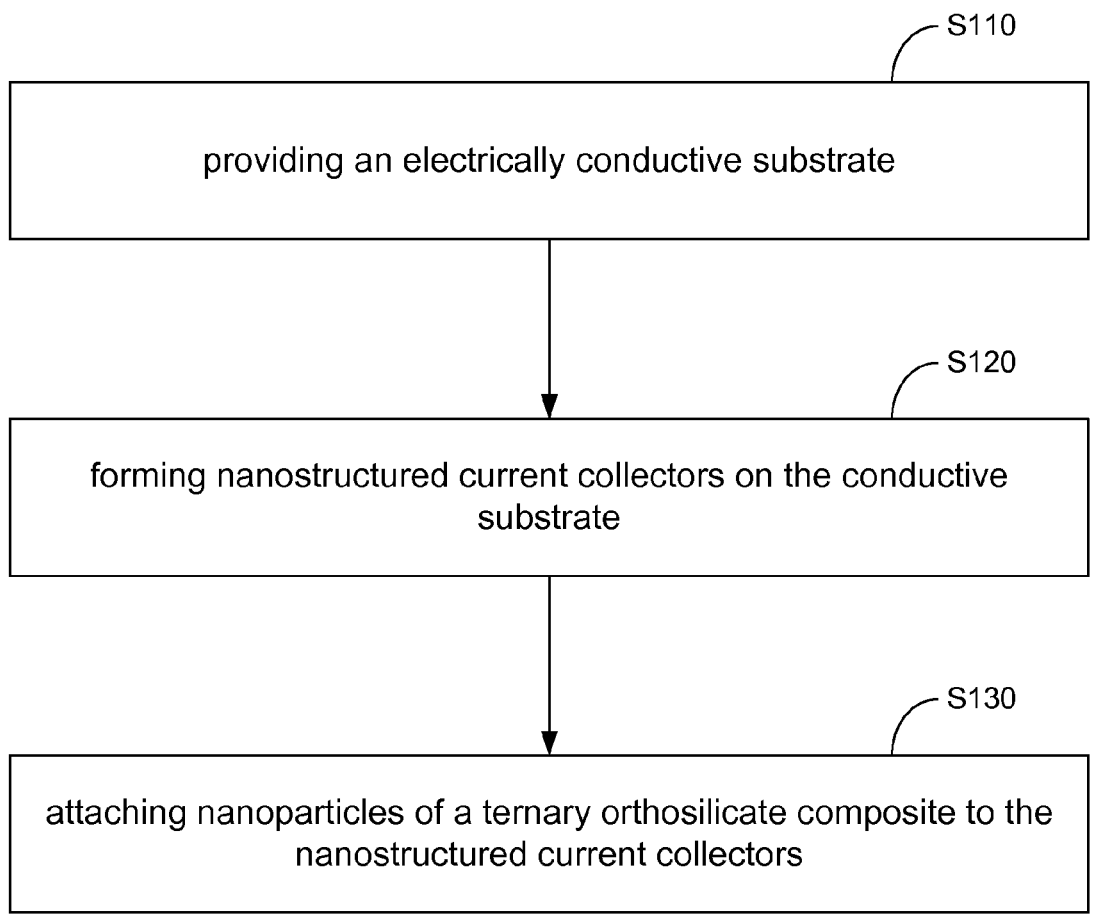
FIG. 1F shows a flowchart of a method of making a lithium-ion battery cathode according to one embodiment of the present invention.

FIG. 1F shows a flowchart of a method of making a lithium-ion battery cathode according to one embodiment of the present invention. According to FIG. 1F, an electrically conductive substrate, such as the conductive substrate 110 in FIG. 1, is provided (step S110), and nanostructured current collectors, such as the CNTs 120 in FIG. 1A or the CFs, are formed or vertically in electrical contact with the conductive substrate (step S120). Then, nanoparticles of a ternary orthosilicate composite, such as the $Li_2Mn_xFe_yCo_zSiO_4$ composite, are attached to the nanostructured current collectors (step S130) to form the cathode. In some embodiments, a further step can be added to fill an electrolyte solution in spaces among the nanostructured current collectors and the nanoparticles of the active material.

The forming or growing of the CNTs can be performed, for example, by a microwave plasma-enhanced chemical vapor deposition (CVD) process. To assist the forming of the CNTs, a thin layer of Ni or Co or a suitable catalyst can be deposited on the conductive substrate as catalyst. In one embodiment, hydrogen-diluted methane or a suitable hydrocarbon can be used as the carbon source.

Example Two

Lithium-Ion Battery Comprising the Cathode

Figure 2:
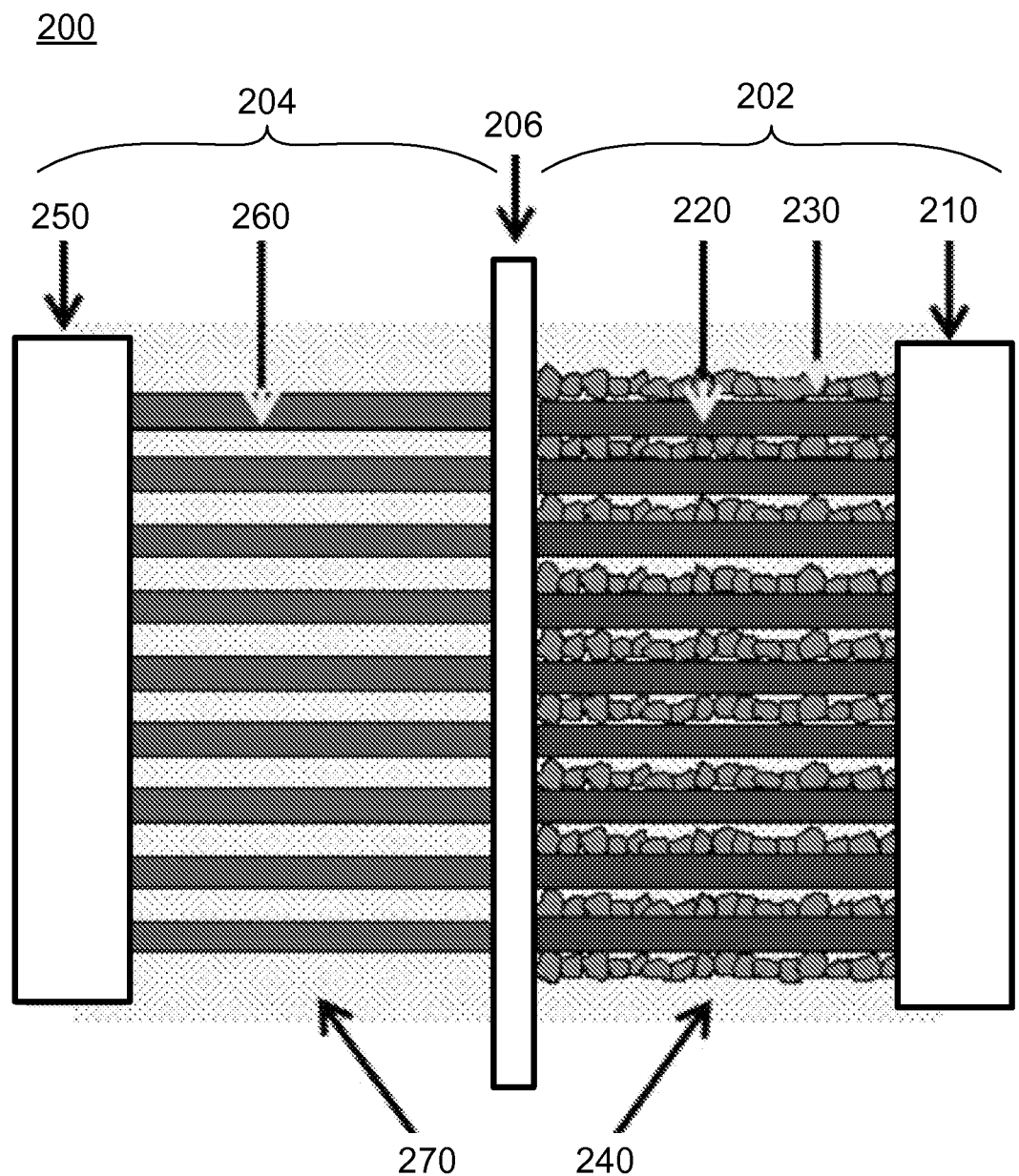
FIG. 2 shows schematically a cross-sectional view of a lithium-ion battery using a cathode according to one embodiment of the present invention.

FIG. 2 shows schematically a cross-sectional view of a lithium-ion battery using a cathode according to one embodiment of the present invention. In FIG. 2, the battery 200 includes a cathode 202, an anode 204, and a separator 206 between the cathode 202 and the anode 204. The cathode 202 is similar to the cathode 100 in FIG. 1A, which includes an electrically conductive substrate 210, CNTs 220 in electrical contact with the conductive substrate 210, nanoparticles 230 of an $Li_2Mn_xFe_yCo_zSiO_4$ composite attached to the CNTs 220, and an electrolyte solution 240 filled in spaces among the CNTs 220 and the nanoparticles 230 of the $Li_2Mn_xFe_yCo_zSiO_4$ composite. The anode 204 includes an electrically conductive substrate 250, anode structures 260 in electrical contact with the conductive substrate 250, and an electrolyte solution 270 filled in spaces among the anode structures 260.

In one embodiment, the conductive substrate 210 of the cathode 202 can be a flexible (or rigid) thin film formed of an electrically conductive material, such as a metal, an alloy, a polymer, graphite, or a conducting oxide. For example, the conductive substrate 210 can be a flexible (or rigid) thin film aluminum or graphite foil.

The CNTs 220 serve as nanostructured current collectors of the cathode. In one embodiment, the CNTs 220 are single walled or multi-walled conductive CNTs formed directly on the conductive substrate 210. In one embodiment, the CNTs 220 have diameters or thicknesses in a range of about 1.0-1,000.0 nm.

The $Li_2Mn_xFe_yCo_zSiO_4$ composite is a ternary orthosilicate composite. In one embodiment, x+y+z=1. In one embodiment, the nanoparticles 230 of the $Li_2Mn_xFe_yCo_zSiO_4$ composite nanoparticles have diameters or sizes in a range of about 1.0-1,000.0 nm.

The anode 204 can be any type of anode. In one embodiment, the conductive substrate 250 of the anode 204 can be a flexible (or rigid) thin film formed of an electrically conductive material, such as a metal, an alloy, a polymer, graphite, or a conducting oxide. For example, the conductive substrate 250 can be a flexible (or rigid) thin film copper foil.

The anode structures 260 serve as nanostructured current collectors of the anode. In one embodiment, the anode structures can be formed of high capacity anode materials, such as silicon nanowires.

In one embodiment, the electrolyte solutions 240 and 270 can be the same electrolyte solution, such as lithium bis (trifluoromethanesulfonyl)imide (LiTFSI) electrolyte.

Example Three

Synthesis of $Li_2Mn_xFe_yCo_zSiO_4$ Solid Solution

An advantage of the $Li_2Mn_xFe_yCo_zSiO_4$ composite as the ternary orthosilicate composite used in the cathode exists in that both the average potential difference of the cathode and the specific capacity of the cathode can be increased. As indicated above, conventional metal oxides used as cathode materials have limited average potential versus Li/Li$^+$, mostly well below 4V, and most of the metal oxides have the specific capacity well below 180 mAh/g. In other words, these metal oxide cathode materials cannot meet both the requirements of the average potential difference being larger than 4V and the specific capacity being larger than 180 mAh/g.

In contrast, the $Li_2Mn_xFe_yCo_zSiO_4$ composite not only allows the specific capacity to reach about 330 mAh/g and provides adequate average potential difference of at least 4V, but also has a satisfactory cycle life with original capacity. Thus, using the $Li_2Mn_xFe_yCo_zSiO_4$ composite as the cathode material may lead to better performance and longer life cycle of the battery.

There are three major synthesis methods of the ternary orthosilicate composite, such as the $Li_2Mn_xFe_yCo_zSiO_4$ composite. One is a hydrothermal synthesis process, the second is the Pechini synthesis process, and the third is the sol-gel process.

Figure 3A:
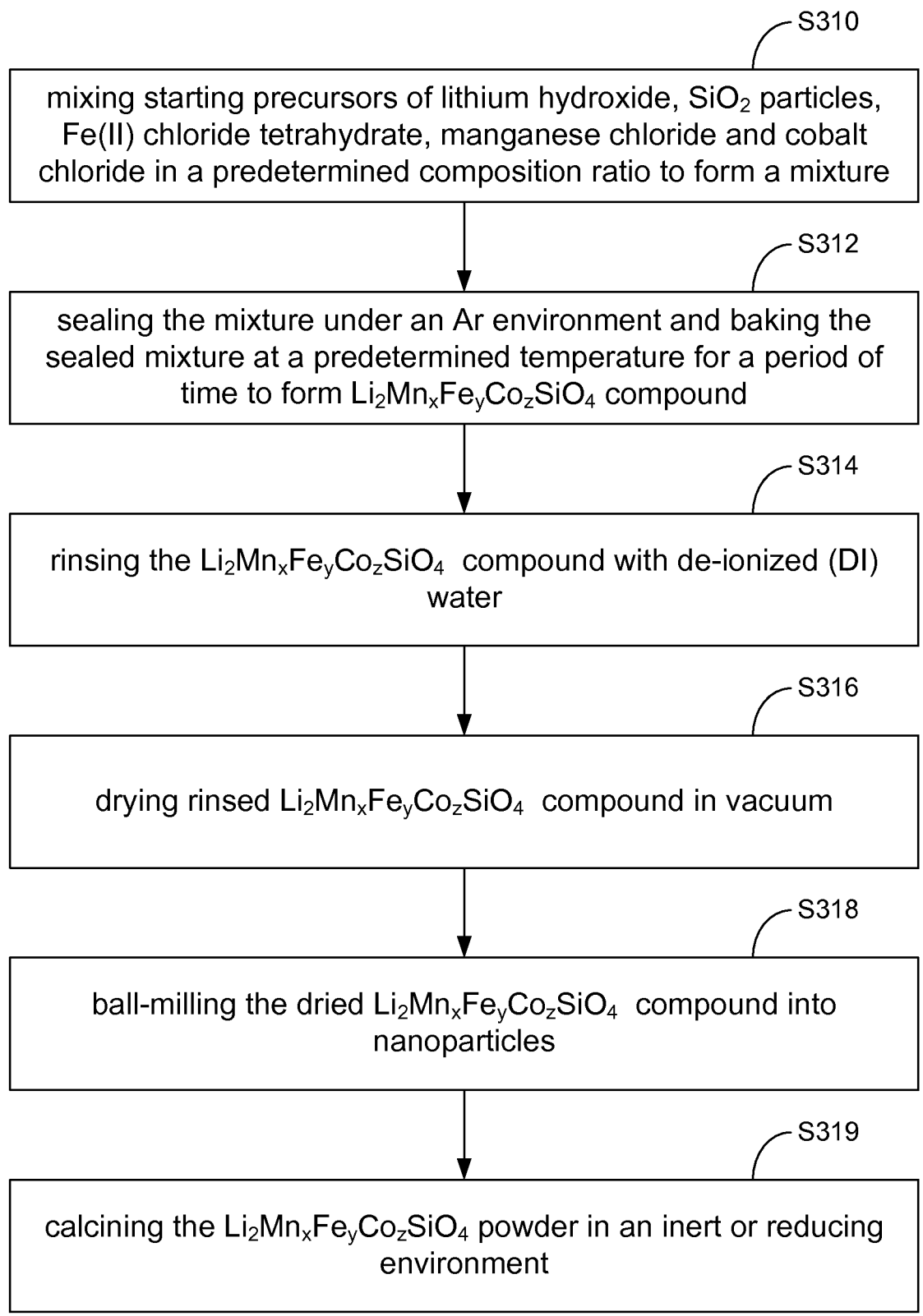
FIG. 3A shows a flowchart of a method of synthesizing the ternary orthosilicate composite by a hydrothermal process according to one embodiment of the present invention.

FIG. 3A shows a flowchart of a method of synthesizing the ternary orthosilicate composite by a hydrothermal process according to one embodiment of the present invention. As shown in FIG. 3A, starting precursors of lithium hydroxide, SiO$_2$ particles, Fe(II) chloride tetrahydrate, manganese chloride, and cobalt chloride are mixed together in a predetermined composition ratio to form a mixture (step S310). Then the mixture is sealed under an Ar environment, and the sealed mixture is baked at a predetermined temperature for a period of time to form $Li_2Mn_xFe_yCo_zSiO_4$ compound (step S312). The $Li_2Mn_xFe_yCo_zSiO_4$ compound is then rinsed with de-ionized (DI) water (step S314), and the rinsed $Li_2Mn_xFe_yCo_zSiO_4$ compound is dried in vacuum (step S316). The dried $Li_2Mn_xFe_yCo_zSiO_4$ compound is ball-milled into nanoparticles (step S318) and finally, the $Li_2Mn_xFe_yCo_zSiO_4$ powders are calcined in an inert or reducing environment (step S319).

Figure 3B:
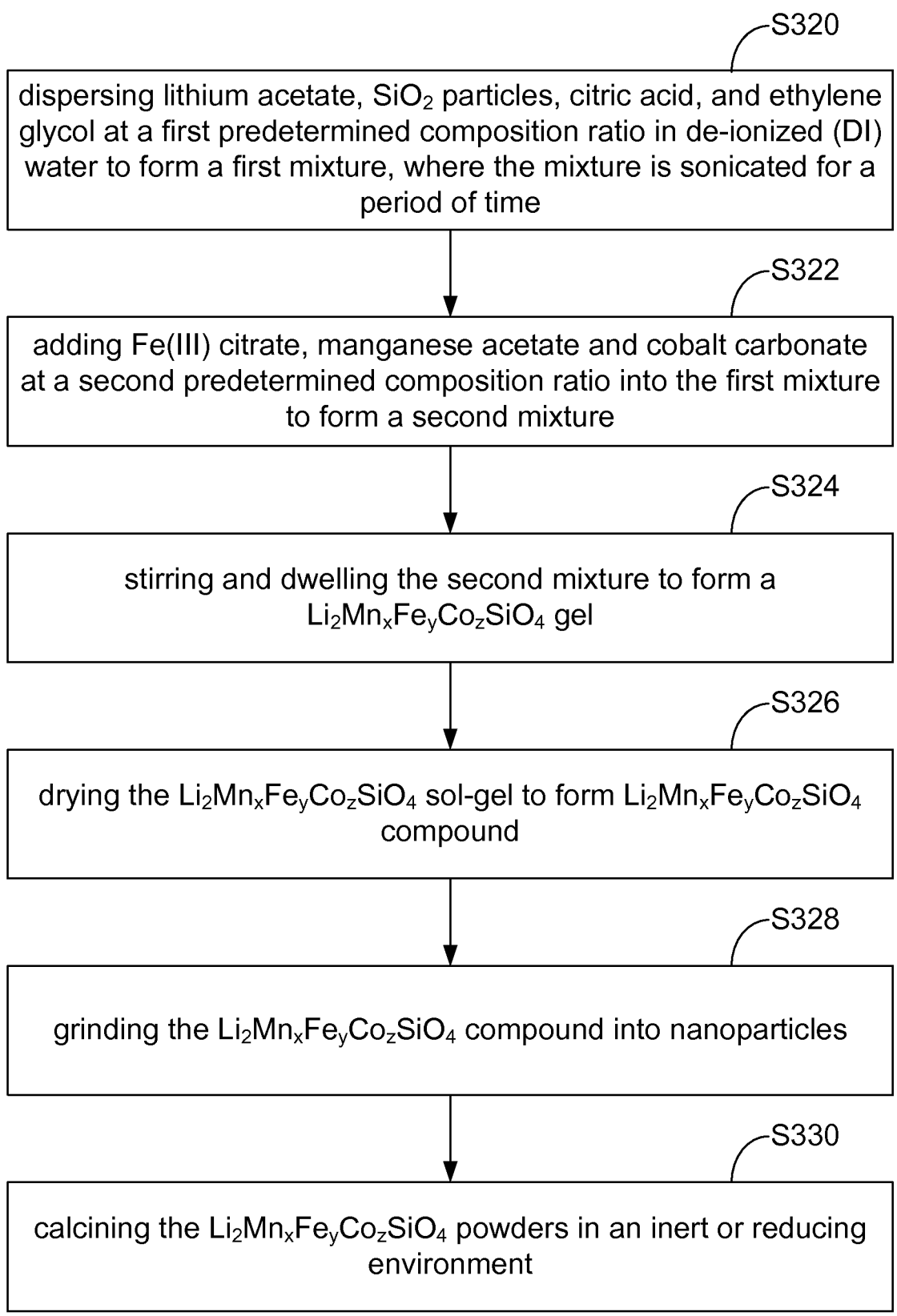
FIG. 3B shows a flowchart of a method of synthesizing the ternary orthosilicate composite by a Pechini process according to one embodiment of the present invention.

FIG. 3B shows a flowchart of a method of synthesizing the ternary orthosilicate composite by a Pechini process according to one embodiment of the present invention. As shown in FIG. 3B, lithium acetate, SiO$_2$ particles, citric acid, and ethylene glycol are dispersed at a first predetermined composition ratio in de-ionized (DI) water to form a first mixture, and the first mixture is sonicated for a period of time (step S320). Then Fe(III) citrate, manganese acetate, and cobalt acetate at a second predetermined composition ratio are added into the first mixture to form a second mixture (step S322). The second mixture is then stirred and dwelled to form a $Li_2Mn_xFe_yCo_zSiO_4$ gel (step S324), and the $Li_2Mn_xFe_yCo_zSiO_4$ sol-gel is dried to form $Li_2Mn_xFe_yCo_zSiO_4$ compound (step S326). The dried $Li_2Mn_xFe_yCo_zSiO_4$ compound are grounded into nanoparticles (step S328). Finally, the $Li_2Mn_xFe_yCo_zSiO_4$ powders are calcined in an inert or reducing environment (step S330).

Figure 3C:
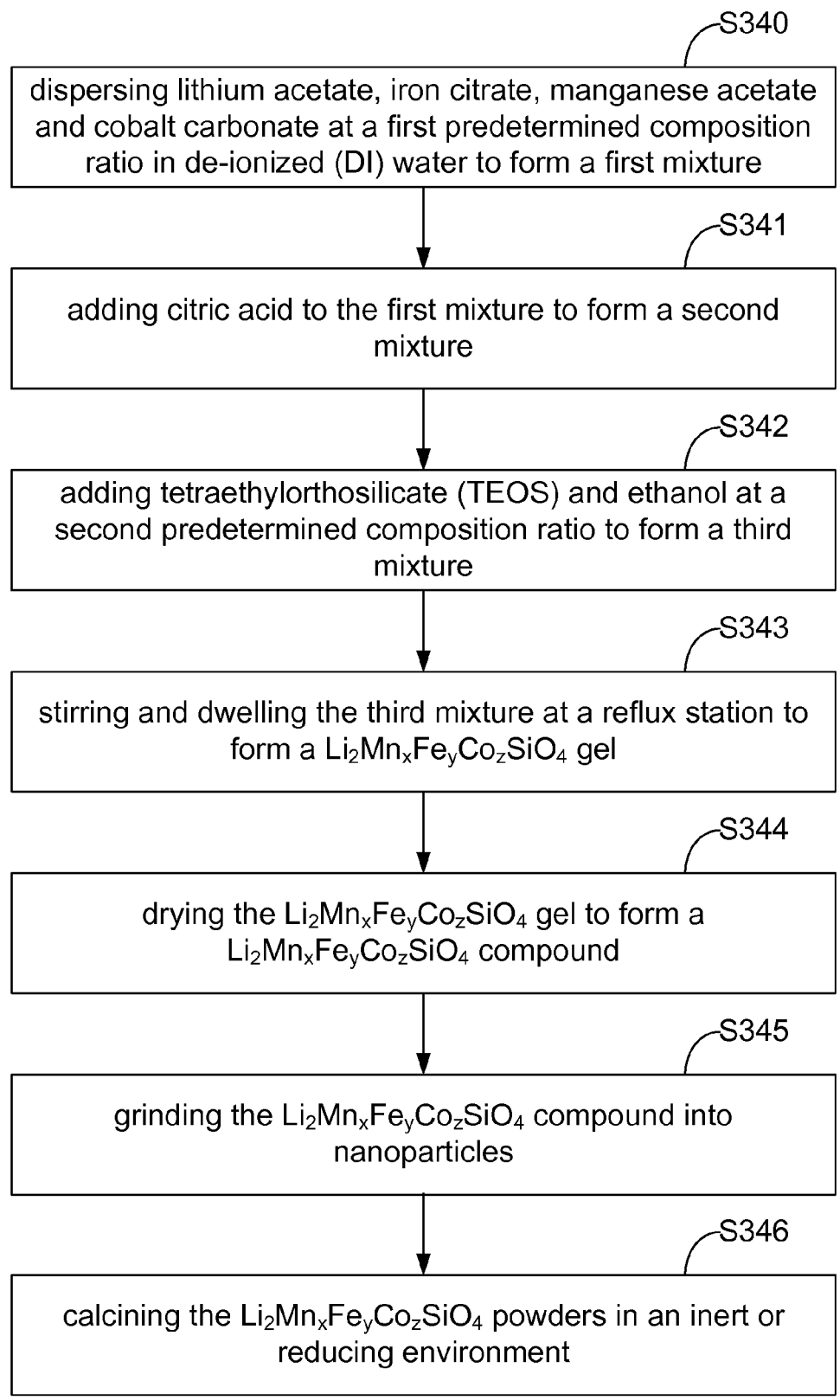
FIG. 3C shows a flowchart of a method of synthesizing the ternary orthosilicate composite by a sol-gel process according to one embodiment of the present invention.

FIG. 3C shows a flowchart of a method of synthesizing the ternary orthosilicate composite by a sol-gel-process according to one embodiment of the present invention. As shown in FIG. 3C, at step S340, lithium acetate, iron citrate, manganese acetate and cobalt carbonate are dispersed at a first predetermined composition ratio in de-ionized (DI) water to form a first mixture. At step S341, citric acid is added to the first mixture to form a second mixture. Then tetraethylorthosilicate (TEOS) and ethanol are added at a second predetermined composition ratio to form a third mixture (at step S342). At step S343, the third mixture at a reflux station is stirred and dwelled to form a $Li_2Mn_xFe_yCo_zSiO_4$ gel. At step S344, the $Li_2Mn_xFe_yCo_zSiO_4$ gel is dried to form a $Li_2Mn_xFe_yCo_zSiO_4$ compound. At step $345, the $Li_2Mn_xFe_yCo_zSiO_4$ compound is grinded into nanoparticles. Then, the $Li_2Mn_xFe_yCo_zSiO_4$ powders are calcined in an inert or reducing environment.

An example of synthesis of $Li_2FeSiO_4$ is used to describe the three synthesis processes as follows.

For the hydrothermal process, the starting precursors of lithium hydroxide, SiO$_2$ particles, and Fe(II) chloride tetrahydrate are mixed in the predetermined composition ratio of 4:1:1 to form the mixture. The mixture is sealed under the Ar environment and baked at 150° C. for 14 days to form the $Li_2FeSiO_4$ powders. The $Li_2FeSiO_4$ powders are then rinsed with de-ionized (DI) water, dried in vacuum, and ball-milled into nanoparticles.

For the Pechini process, lithium acetate, SiO$_2$ particles, citric acid, and ethylene glycol are dispersed at the first predetermined composition ratio of 2:1:2:1 in the DI water to form the first mixture, and the first mixture is sonicated for 2 hours. Then Fe(III) citrate is added to the first mixture (at the second predetermined composition ratio of 1:0:0 since neither Mn nor Co is used) to form the second mixture. After further stirring and dwelling of the second mixture, the $Li_2FeSiO_4$ gel is formed, which is then dried and ground into nanoparticles. Finally, the $Li_2FeSiO_4$ powders are heat treated in the CO/CO$_2$ environment to generate the end product.

For the sol-gel process, lithium acetate and iron citrate are dispersed at the pre-determined ratio of 2:1 in de-ionized (DI) water to form a first mixture. Saturated solution of citric acid is added to the first mixture to form a second mixture. Tetraethylorthosilicate (TEOS) and ethanol are added at a second predetermined composition ratio to form third mixture which is stirred at 80° C. for 14 hours at a reflux station to form $Li_2FeSiO_4$ gel. The $Li_2FeSiO_4$ gel is dried and ground into nanoparticles. Finally, the $Li_2FeSiO_4$ powder is calcined in an Argon atmosphere.

The three processes can be applied for the synthesis of the ternary orthosilicate composite, such as $Li_2Mn_xFe_yCo_zSiO_4$, where Mn, Fe and Co all exist in the composite. In one embodiment, the ternary orthosilicate composite obtained can be subsequently dispersed onto the CNTs by a dripping or wetting method. Specifically, a suspension of the nanoparticles of the ternary orthosilicate composite can be prepared in a liquid medium. Then, by dripping the suspension into the nanostructured current collectors in electrical contact with the conductive substrate and drying the suspension, the nanoparticles of the ternary orthosilicate composite are coated onto the nanostructured current collectors. By varying the number of droplets applied in the dripping process, the mass ratio of the $Li_2Mn_xFe_yCo_zSiO_4$ composite to the CNTs can be controlled.

In one embodiment, the liquid medium includes acetone, water or other liquid media.

Figure 3D:
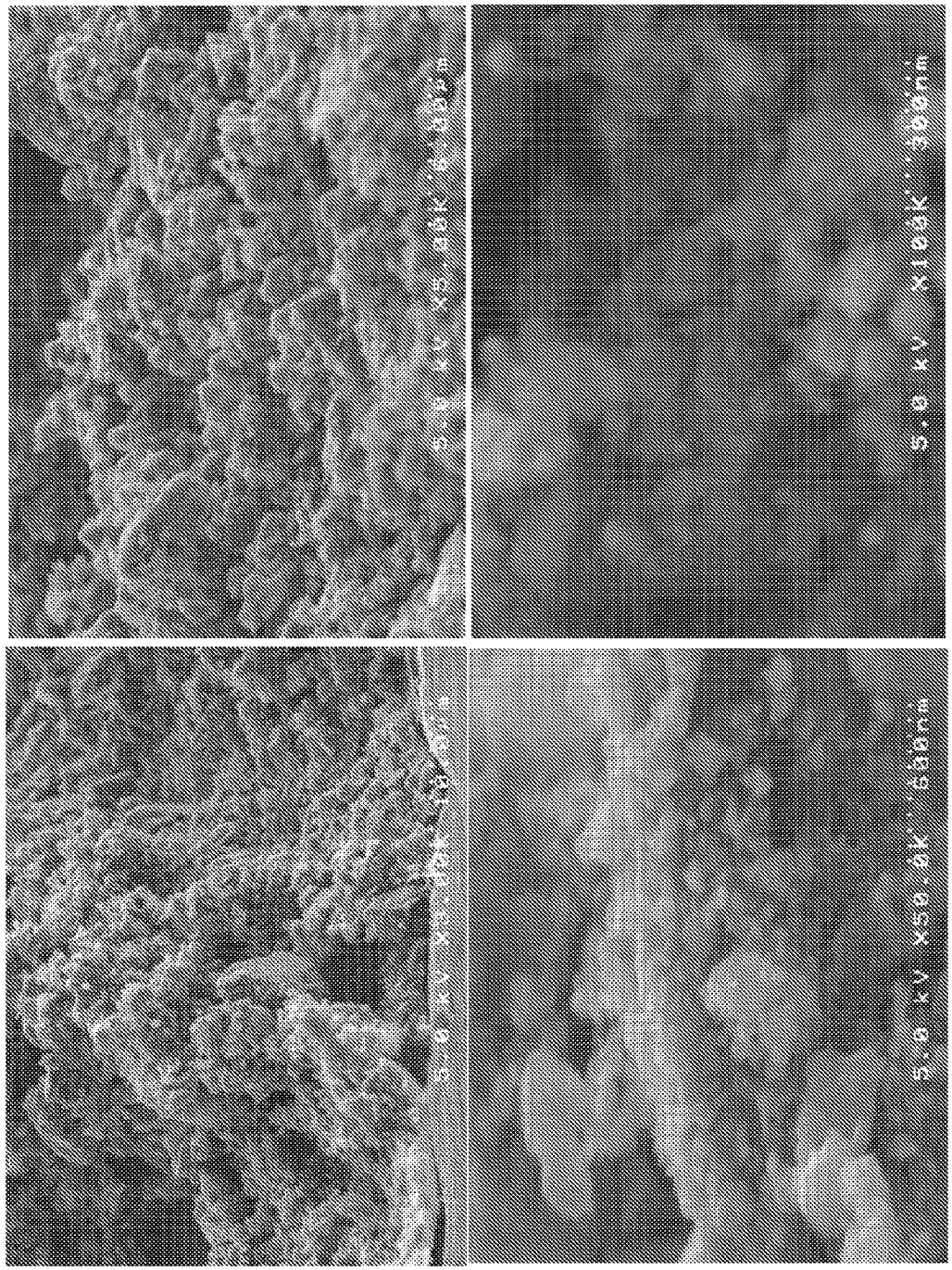
FIG. 3D shows SEM images of nanoparticles of the $Li_2Mn_xFe_yCo_zSiO_4$ composite coated CNTs at different magnifications according to one embodiment of the present invention.

FIG. 3D shows SEM images of nanoparticles of the $Li_2Mn_xFe_yCo_zSiO_4$ composite attached to the CNTs at different magnifications according to one embodiment of the present invention.

The performance of the $Li_2Mn_xFe_yCo_zSiO_4$ composite can be verified with material characterization analysis, such as SEM, energy-dispersive X-ray spectroscopy (EDS), differential scanning calorimetry (DSC) and X-ray diffraction (XRD) analysis.

Figure 4A:
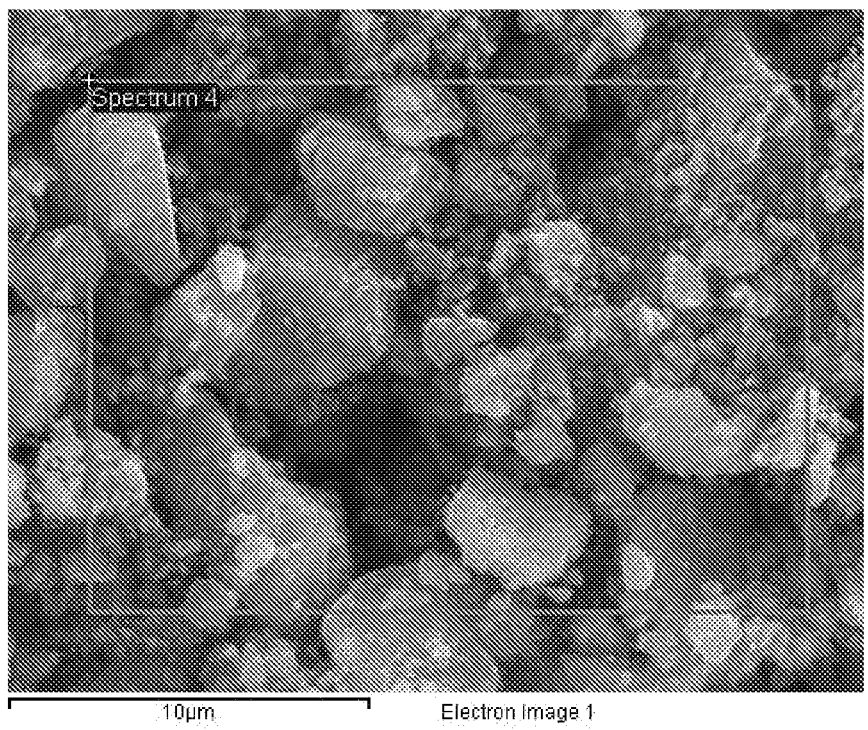
FIG. 4A shows an SEM image of nanoparticles of the $Li_2Mn_xFe_yCo_zSiO_4$ composite according to one embodiment of the present invention, where x=0.25, y=0.5, and z=0.25.
Figure 4B:
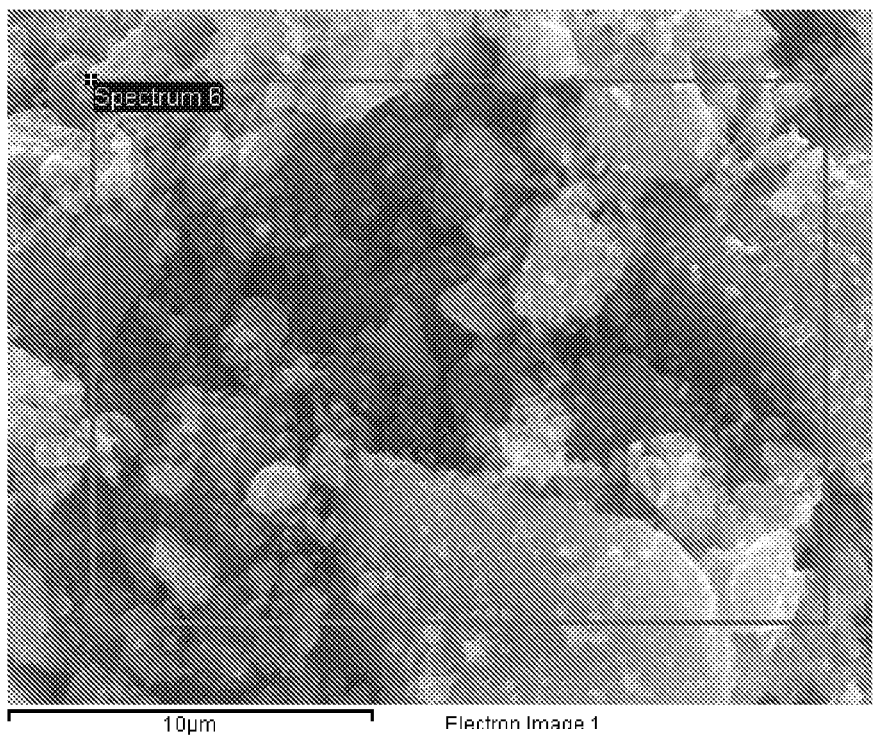
FIG. 4B shows an SEM image of nanoparticles of the $Li_2Mn_xFe_yCo_zSiO_4$ composite according to one embodiment of the present invention, where x=0.1, y=0.8, and z=0.1.
Figure 5A:
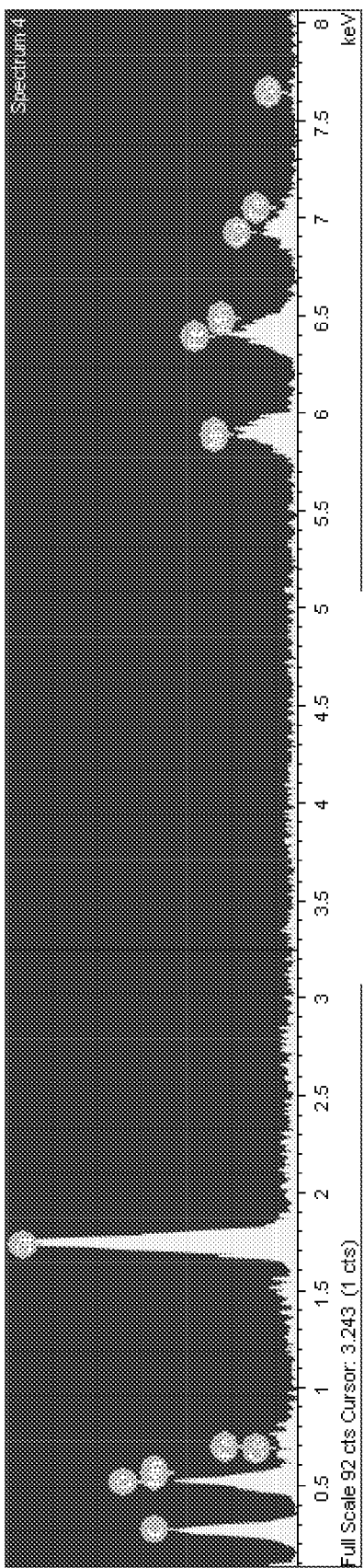
FIG. 5A shows an energy-dispersive X-ray spectroscopy (EDS) spectrum of nanoparticles of the $Li_2Mn_xFe_yCo_zSiO_4$ composite according to one embodiment of the present invention, where x=0.25, y=0.5, and z=0.25.
Figure 5B:
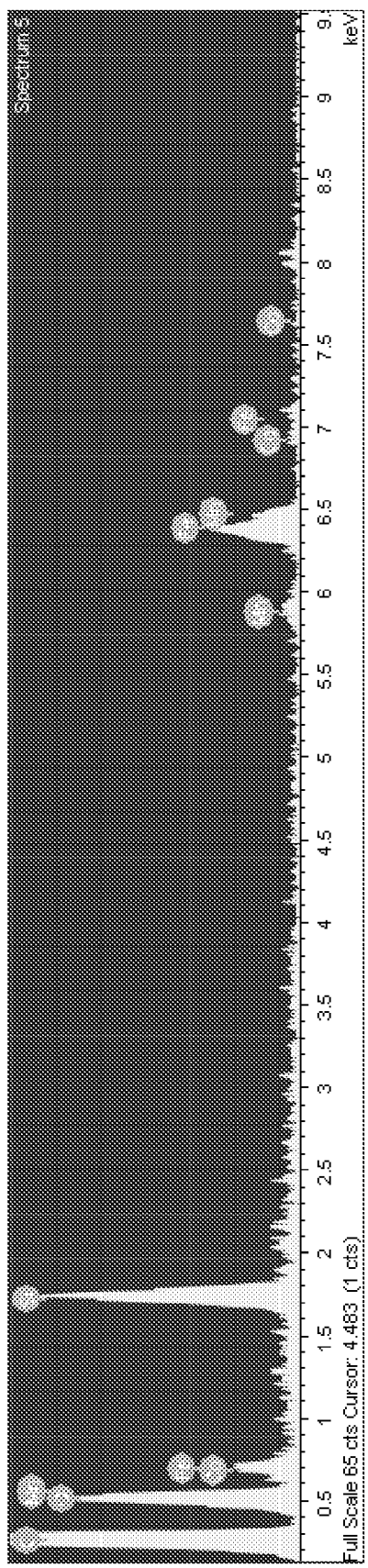
FIG. 5B shows an EDS spectrum of nanoparticles of the $Li_2Mn_xFe_yCo_zSiO_4$ composite according to one embodiment of the present invention, where x=0.1, y=0.8, and z=0.1.
Figure 6A:
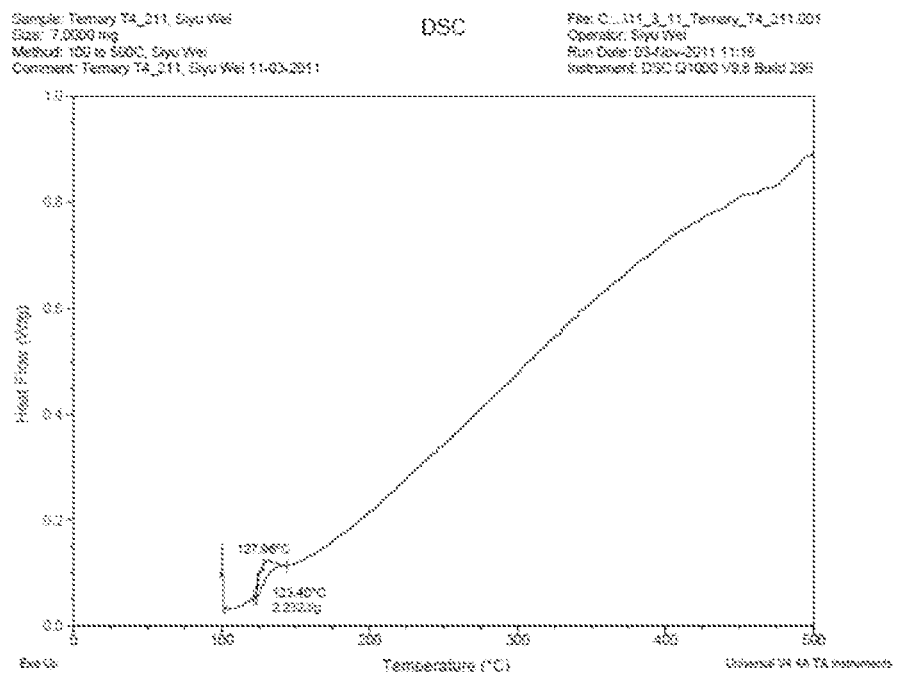
FIG. 6A shows a DSC plot of the $Li_2Mn_xFe_yCo_zSiO_4$ composite according to one embodiment of the present invention, where x=0.25, y=0.5, and z=0.25.
Figure 6B:
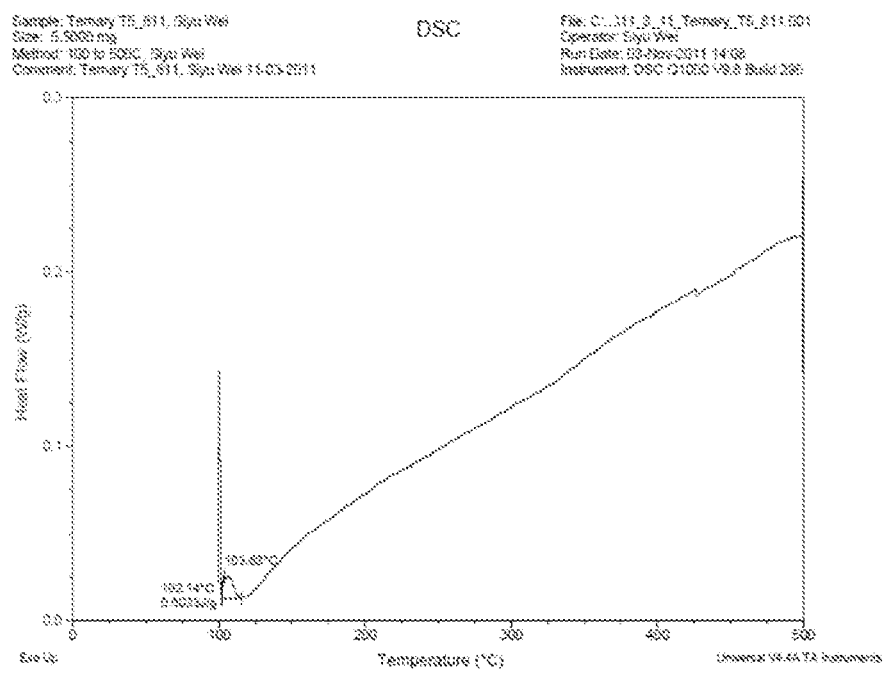
FIG. 6B shows a DSC plot of the $Li_2Mn_xFe_yCo_zSiO_4$ composite according to one embodiment of the present invention, where x=0.1, y=0.8, and z=0.1.

FIGS. 4A and 4B show two SEM images of nanoparticles of the $Li_2Mn_xFe_yCo_zSiO_4$ composite according to one embodiment of the present invention. The two figures represent two embodiments. In FIG. 4A, x=0.25, y=0.5, and z=0.25, referring to the ternary orthosilicate composite of $Li_2Mn_{0.25}Fe_{0.5}Co_{0.25}SiO_4$. In FIG. 4B, x=0.1, y=0.8, and z=0.1, referring to the ternary orthosilicate composite of $Li_2Mn_{0.1}Fe_{0.8}Co_{0.1}SiO_4$. FIGS. 5A and 5B shows energy-dispersive X-ray spectroscopy (EDS) diagrams of the nanoparticles of the $Li_2Mn_xFe_yCo_zSiO_4$ composite in FIGS. 4A and 4B, respectively. FIGS. 6A and 6B shows differential scanning calorimetry (DSC) diagrams of the nanoparticles of the $Li_2Mn_xFe_yCo_zSiO_4$ composite in FIGS. 4A and 4B, respectively.

An expected composite ratio in the form of Mn:Fe:Co of the $Li_2Mn_xFe_yCo_zSiO_4$ composite in FIGS. 4A and 5A is 1:2:1 (0.25:0.5:0.25). However, as shown in FIG. 5A, quantitative analysis of the EDS data shows that the composite ratio is about 1.6:1:1.5. An expected composite ratio in the form of Mn:Fe:Co of the $Li_2Mn_xFe_yCo_zSiO_4$ composite in FIGS. 4B and 5B is 1:8:1 (0.1:0.8:0.1). However, as shown in FIG. 5A, quantitative analysis of the EDS data shows that the composite ratio is about 1:10:1. Both FIGS. 6A and 6B show that, under calorimetric measurements, the $Li_2Mn_xFe_yCo_zSiO_4$ composites have good thermal behavior with negligible exothermic release at the temperature under 500° C.

Figure 7:
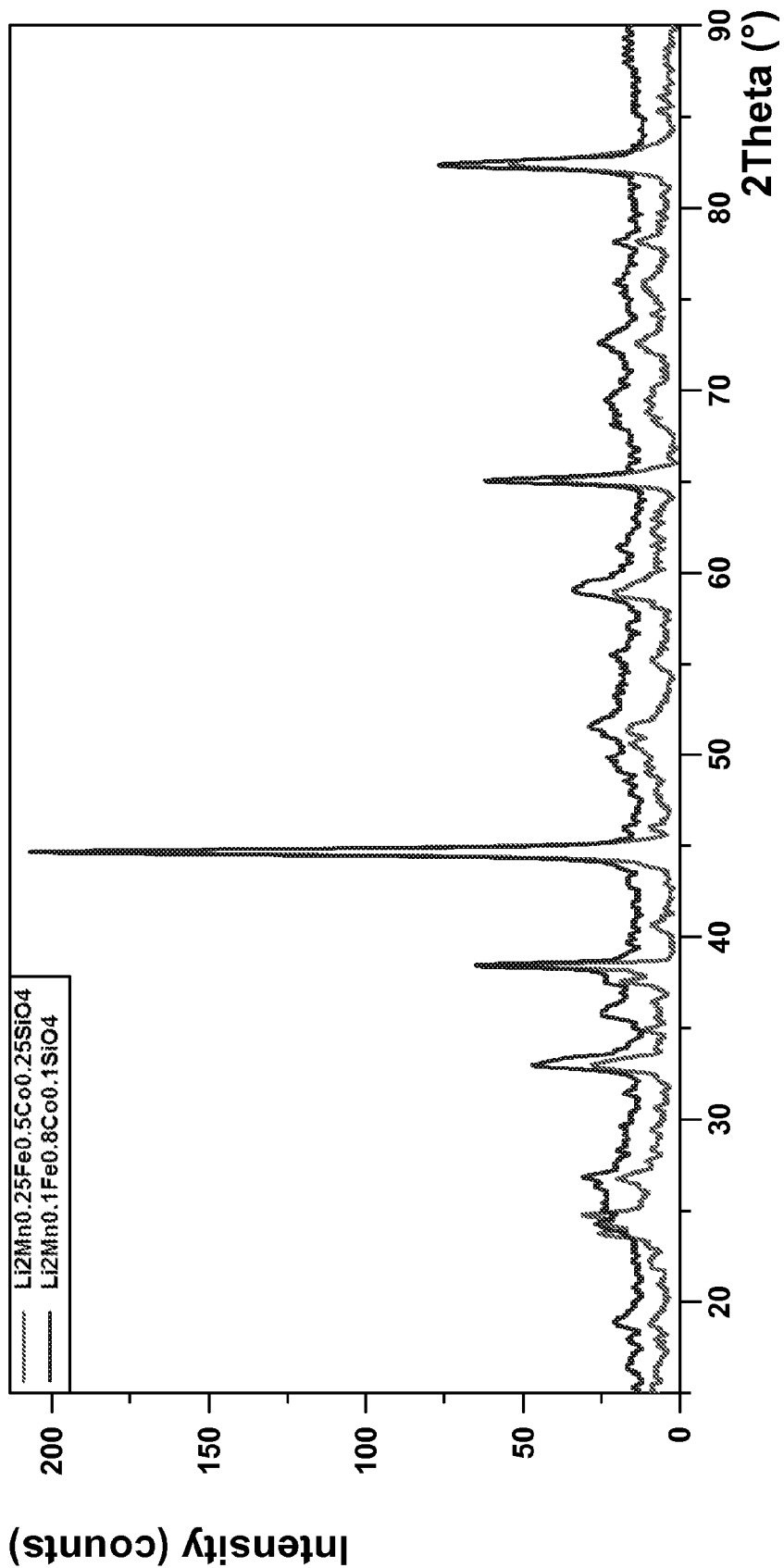
FIG. 7 shows XRD spectra of the $Li_2Mn_xFe_yCo_zSiO_4$ composite according to one embodiment of the present invention, where x=0.25, y=0.5, and z=0.25 and according to second embodiment of the present invention, where x=0.1, y=0.8, and z=0.1.

FIG. 7 shows XRD spectra of the $Li_2Mn_xFe_yCo_zSiO_4$ composites according to two embodiments of the present invention, where x=0.25, y=0.50, z=0.25 and, where x=0.1, y=0.8, z=0.1.

Figure 8A:
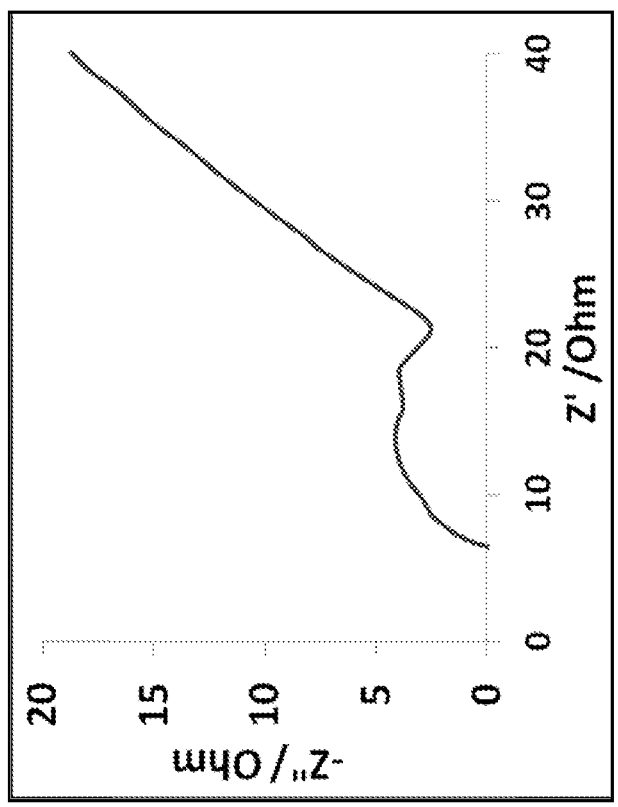
FIG. 8A shows a Nyquist plot of the impedance of the cathode with the $Li_2Mn_xFe_yCo_zSiO_4$ composite at 3V according to one embodiment of the present invention, where x=0.1, y=0.8, and z=0.1.
Figure 8B:
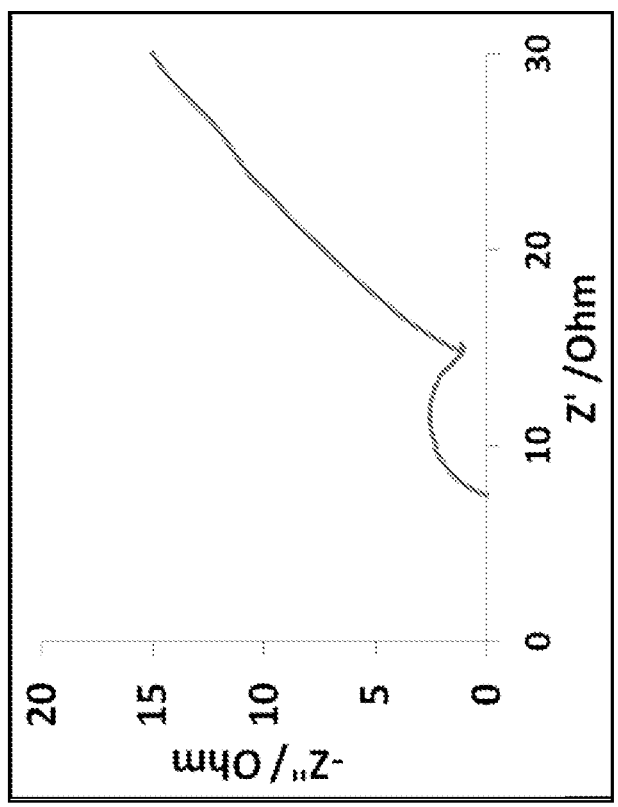
FIG. 8B shows a Nyquist plot of the impedance of the cathode with the $Li_2Mn_xFe_yCo_zSiO_4$ composite at 4.7V according to one embodiment of the present invention, where x=0.1, y=0.8, and z=0.1.

FIGS. 8A and 8B show diagrams of the impedance of the cathode with the $Li_2Mn_xFe_yCo_zSiO_4$ composite at 3V and 4.7V, respectively, according to one embodiment of the present invention, where x=0.1, y=0.8, and z=0.1. Excess coating of the $Li_2Mn_xFe_yCo_zSiO_4$ composite on the CNTs would lead to high equivalent series resistance (ESR) and degrading discharge capacity.

Example Four

Performance of the LIB

In order to show the performance of the LIB of the present invention, five embodiments of the LIB using cathodes with different composition ratio and weight of the $Li_2Mn_xFe_yCo_zSiO_4$ composite and different discharge voltage window are provided.

Figure 9A:
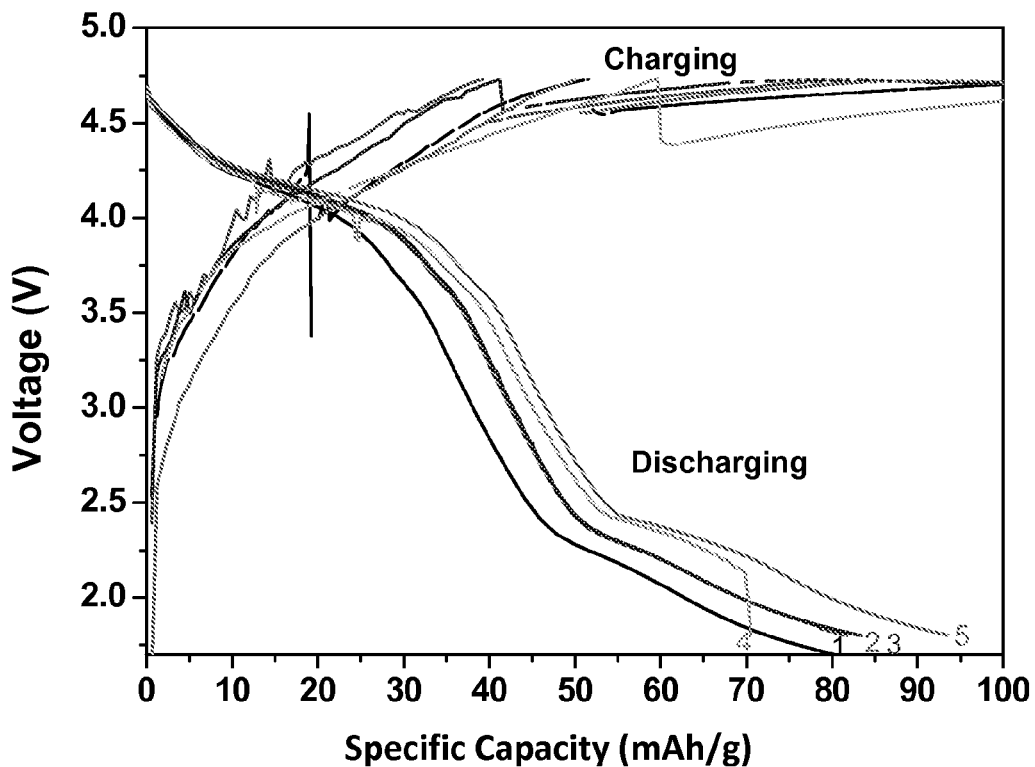
FIG. 9A shows a plot of the cell performance of the lithium ion battery using the cathode with the $Li_2Mn_{0.25}Fe_{0.5}Co_{0.25}SiO_4$ composite with the weight of 4.0 mg according to one embodiment of the present invention.

FIG. 9A shows a diagram of the cell performance of the lithium ion battery using the cathode with the $Li_2Mn_{0.25}Fe_{0.5}Co_{0.25}SiO_4$ composite with the weight of 4.0 mg according to one embodiment of the present invention. In this embodiment, the discharge voltage window is 4.7-2.0 V. For the performance obtained, the discharge capacity is 63-80 mAh/g, the specific energy is 180-263 Wh/kg, and the specific power is 178 W/kg. As shown in FIG. 9A, the cathode performance of this embodiment is unsatisfactory due to the composition ratio and too thick amount by weight of the ternary orthosilicate composite coating on the CNTs.

Figure 9B:
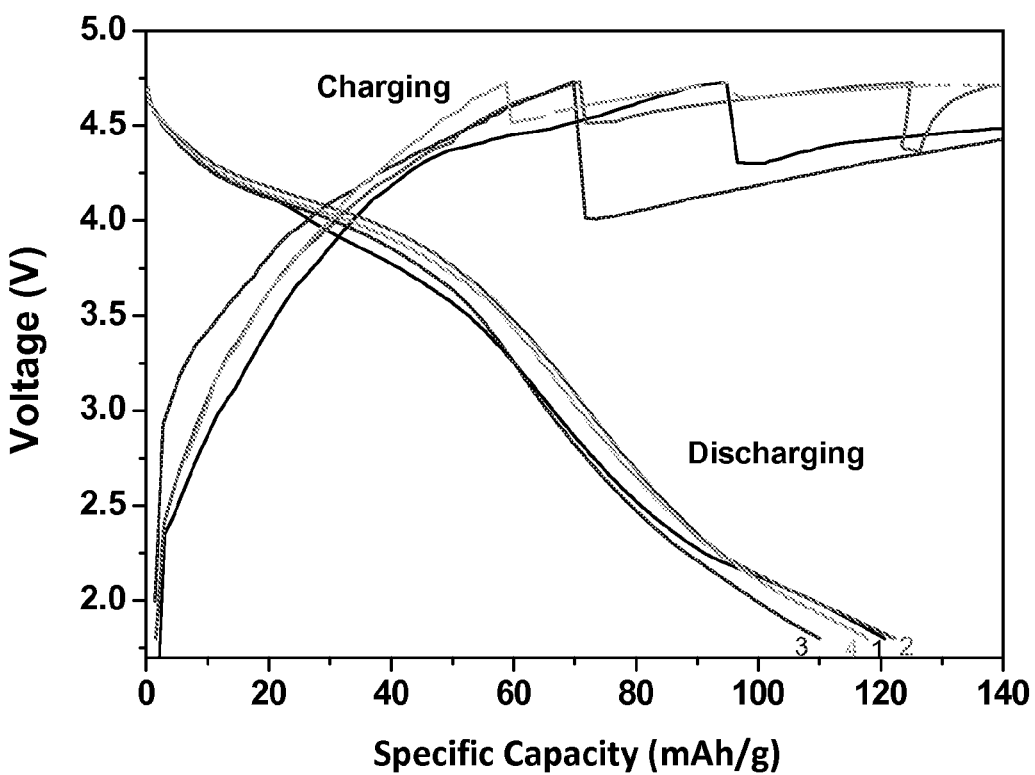
FIG. 9B shows a plot of the cell performance of the lithium ion battery using the cathode with the $Li_2Mn_{0.25}Fe_{0.5}Co_{0.25}SiO_4$ composite with the weight of 1.6 mg according to one embodiment of the present invention.

FIG. 9B shows a diagram of the cell performance of the lithium ion battery using the cathode with the $Li_2Mn_{0.25}Fe_{0.5}Co_{0.25}SiO_4$ composite with the weight of 1.6 mg according to one embodiment of the present invention. In this embodiment, the discharge voltage window is 4.7-2.0 V. For the performance obtained, the discharge capacity is 100-109 mAh/g, the specific energy is 337-369 Wh/kg, and the specific power is 439 W/kg. As shown in FIG. 9B, the cathode performance of this embodiment is improved comparing to the embodiment of FIG. 9A due to thinner amount by weight of the ternary orthosilicate composite coating on the CNTs.

Figure 9C:
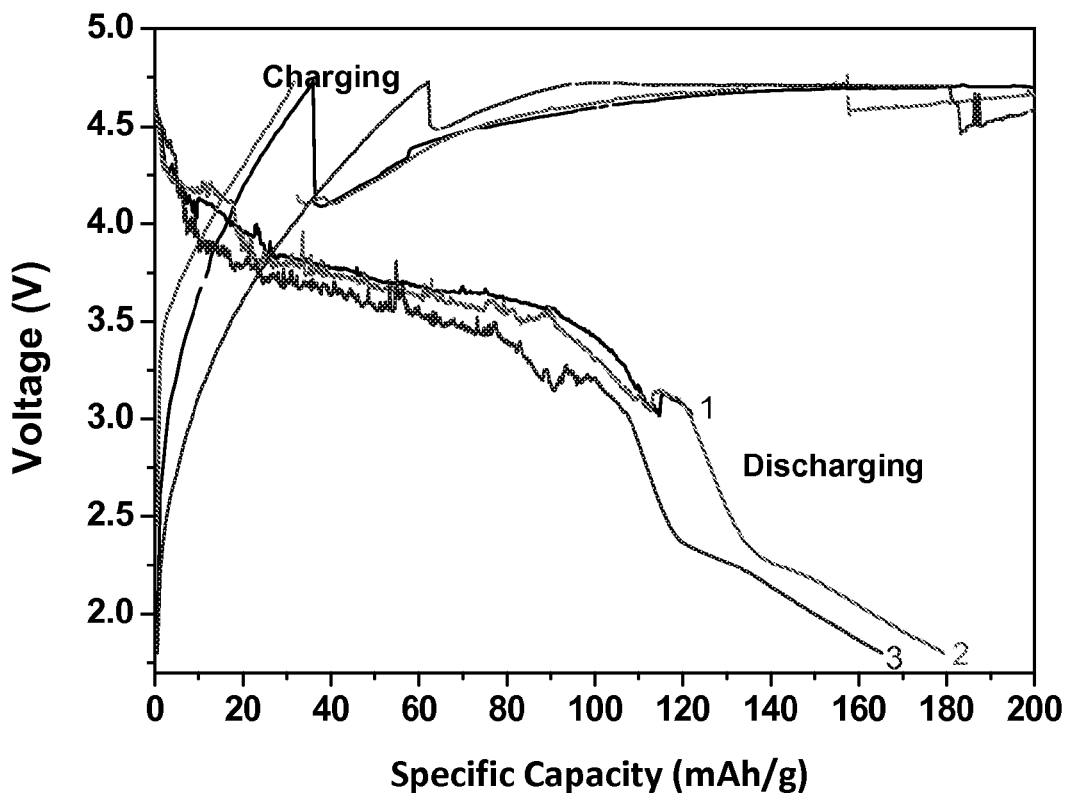
FIG. 9C shows a plot of the cell performance of the lithium ion battery using the cathode with the $Li_2Mn_{0.1}Fe_{0.8}Co_{0.1}SiO_4$ composite with the weight of 3.9 mg according to one embodiment of the present invention.

FIG. 9C shows a diagram of the cell performance of the lithium ion battery using the cathode with the $Li_2Mn_{0.1}Fe_{0.8}Co_{0.1}SiO_4$ composite with the weight of 3.9 mg according to one embodiment of the present invention. In this embodiment, the discharge voltage window is 4.7-2.0 V. For the performance obtained, the discharge capacity is 150-163 mAh/g, the specific energy is 467-518 Wh/kg, and the specific power is 178 W/kg. As shown in FIG. 9C, the cathode performance of this embodiment is improved comparing to the embodiment of FIG. 9A due to adjustment of the composite ratio of the ternary orthosilicate composite coating on the CNTs.

Figure 9D:
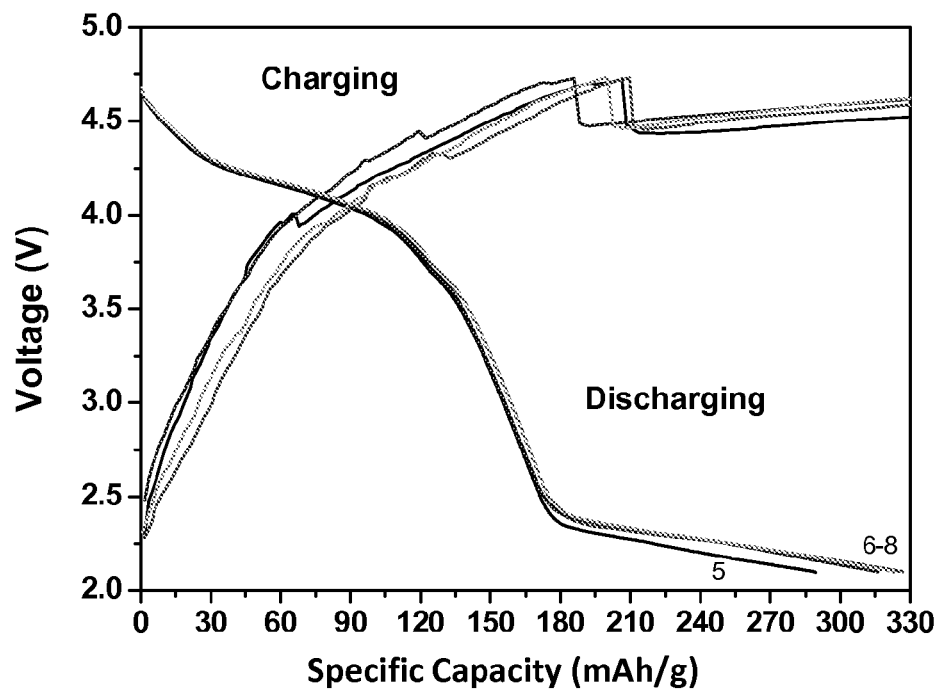
FIG. 9D shows a plot of the cell performance of the lithium ion battery using the cathode with the $Li_2Mn_{0.1}Fe_{0.8}Co_{0.1}SiO_4$ composite with the weight of 1.4 mg and the discharge voltage window of 4.7-2.0 V according to one embodiment of the present invention.

FIG. 9D shows a diagram of the cell performance of the lithium ion battery using the cathode with the $Li_2Mn_{0.1}Fe_{0.8}Co_{0.1}SiO_4$ composite with the weight of 1.4 mg and the discharge voltage window of 4.7-2.0 V according to one embodiment of the present invention. In this embodiment, the discharge voltage window is 4.7-2.0 V. For the performance obtained, the discharge capacity is 288-325 mAh/g, the specific energy is 919-984 Wh/kg, and the specific power is 489 W/kg. As shown in FIG. 9D, the cathode performance of this embodiment is greatly improved comparing to the previous embodiments of FIGS. 9A-9C due to adjustment of the composite ratio and thinner amount by weight of the ternary orthosilicate composite coating on the CNTs.

Figure 9E:
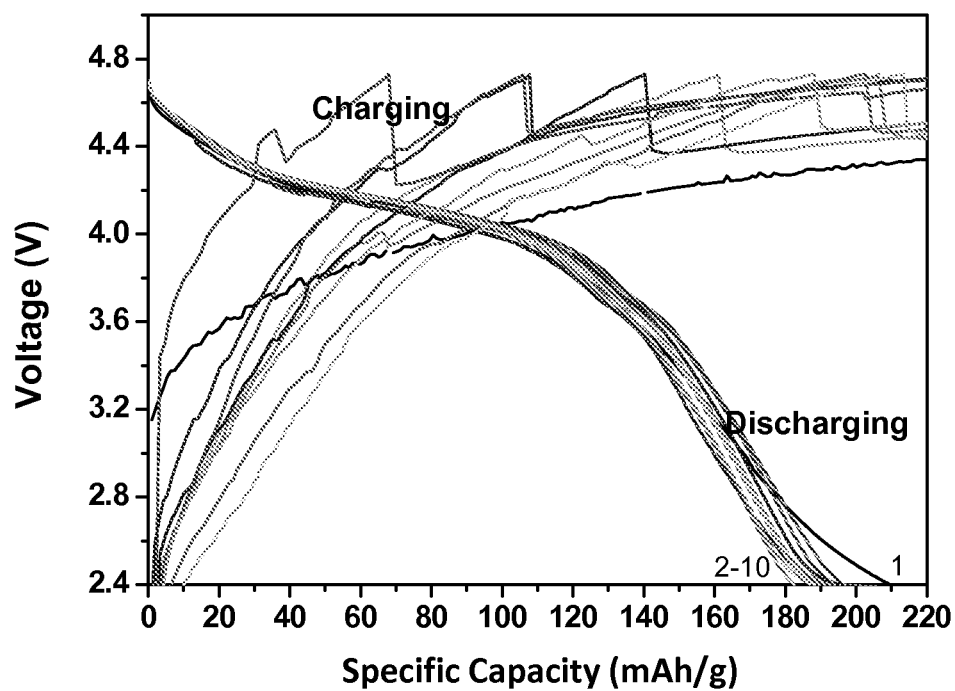
FIG. 9E shows a plot of the cell performance of the lithium ion battery using the cathode with the $Li_2Mn_{0.1}Fe_{0.8}Co_{0.1}SiO_4$ composite with the weight of 1.4 mg and the discharge voltage window of 4.7-2.4 V according to one embodiment of the present invention.

FIG. 9E shows a diagram of the cell performance of the lithium ion battery using the cathode with the $Li_2Mn_{0.1}Fe_{0.8}Co_{0.1}SiO_4$ composite with the weight of 1.4 mg and the discharge voltage window of 4.7-2.4 V according to one embodiment of the present invention. In this embodiment, the discharge voltage window is 4.7-2.4 V. For the performance obtained, the discharge capacity is 182-209 mAh/g, the specific energy is 695-764 Wh/kg, and the specific power is 485 W/kg. The average voltage of the battery is 4.0-4.05 V. As shown in FIG. 9E, the cathode performance of this embodiment is also greatly improved comparing to the previous embodiments of FIGS. 9A-9C. The high discharge capacity is larger than 180 mAh/g and the specific energy is larger than 600 Wh/kg at the average voltage of larger than 4V. Further, the battery is stable in that the discharge capacity maintains more than 90% of its original discharge capacity of 209 mAh/g at the voltage range of 4.7-2.4 V within 10 cycles. The discharge capacity is also close to its theoretical limit of 330 mAh/g for 4 cycles in the voltage range of 4.7-2.1 V.

Figure 10:
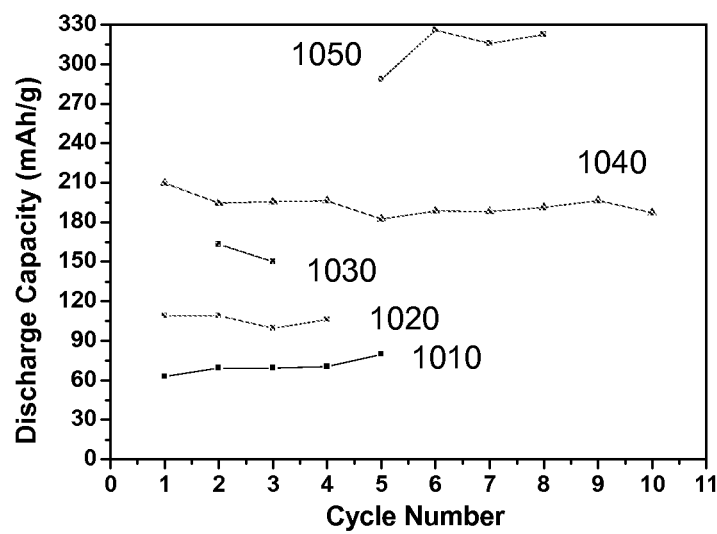
FIG. 10 shows a plot of the discharge capacity-cycle number relationship of the lithium ion batteries of FIGS. 9A-9E according to one embodiment of the present invention.

FIG. 10 shows a diagram of the discharge capacity-cycle number relationship of the lithium ion batteries of FIGS. 9A-9E according to one embodiment of the present invention. In FIG. 10, the lines 1010, 1020, 1030, 1040 and 1050 respectively represent the lithium ion batteries of FIGS. 9A-9E. As shown by the lines 1040 and 1050 in FIG. 10, high performance lithium ion batteries, such as the batteries in FIGS. 9D and 9E, can achieve extremely high discharge capacity of larger than 180 mAh/g within 10 cycles at voltage range of 4.7-2.4 V, which is larger than 90% of its original first discharge capacity of 209 mAh/g. Further, the battery of FIG. 9E can achieve deep discharge capacity of about 330 mAh/g in the voltage range of 4.7-2.1V, which is close to its theoretical limit of 330 mAh/g.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

REFERENCE LIST

[1] S. Wei, W. P. Kang, J. L. Davidson, B. R. Rogers, and J. H. Huang, ECS Transactions 28, 97 (2010).
[2] J. M. Tarascon and M. Armand, Nature 414, 359 (2001).
[3] A. Manthiram, J. Phys. Chem. Lett. 2, 176 (2011).
[4] R. Dominko, M. Bele, M. Gaberscek, A. Meden, M. Remskar, and J. Jamnik, Electrochem. Comm. 8, 217 (2006).
[5] M. E. Arroyo-deDompablo, R. Dominko, J. M. Gallardo-Amores, L. Dupont, G. Mali, H. Ehrenberg, J. Jamnik, and E. Moran, Chem. Mater. 20, 5574 (2008).
[6] T. Muraliganth, K. R. Stroukoff, and A. Manthiram, Chem. Mater. 22, 5754 (2010).
[7] A. Kokalj, R. Dominko, G. Mali, A. Meden, M. Gaberscek, and J. Jamnik, Chem. Mater. 19, 3633 (2007).
[8] R. Dominko, J. Power Sources 184, 462 (2008).
[9] A. Nyten, A. Abouimrane, M. Armand, T. Gustafsson, and J. O. Thomas, Electrochem. Comm. 7, 156 (2005).
[10] C. Lyness, B. Delobel, A. R. Armstrong, and P. G. Bruce, Chem. Commum., 4890 (2007).

What is claimed is:

1. An electrode useable in an electrochemical cell, comprising:
    (a) an electrically conductive substrate;
    (b) conductive nanotubes/fibers grown on the conductive substrate; and
    (c) nanoparticles of an $Li_2Mn_xFe_yCo_zSiO_4$ composite coated on the conductive nanotubes/fibers, wherein $0<x<1$, $0<y<1$, $0<z<1$, and $x+y+z=1$.

2. The electrode of claim 1, wherein the conductive substrate comprises a film formed of an electrically conductive material.

3. The electrode of claim 2, wherein the film is flexible or rigid.

4. The electrode of claim 2, wherein the conductive material comprises a metal, an alloy, a polymer, graphite, or a conducting oxide.

5. The electrode of claim 1, wherein the conductive nanotubes/fibers comprise carbon nanotubes (CNTs) or carbon fibers (CFs).

6. The electrode of claim 5, wherein the CNTs or CFs have diameters in a range of about 1.0-1,000.0 nm and lengths in a micrometer range.

7. The electrode of claim 1, wherein the nanoparticles of the $Li_2Mn_xFe_yCo_zSiO_4$ composite have diameters or sizes in a range of about 1.0-1000.0 nm.

8. The electrode of claim 1, further comprising an electrolyte solution filled in spaces defined among the conductive nanotubes/fibers and the nanoparticles of the $Li_2Mn_xFe_yCo_zSiO_4$ composite.

9. An electrode useable in an electrochemical cell, comprising:
    (a) an electrically conductive substrate;
    (b) nanostructured current collectors grown on the conductive substrate; and
    (c) nanoparticles of a ternary orthosilicate composite coated on the nanostructured current collectors, wherein the ternary orthosilicate composite comprises $Li_2Mn_xFe_yCo_zSiO_4$, wherein $0<x<1$, $0<y<1$, $0<z<1$, and $x+y+z=1$.

10. The electrode of claim 9, wherein the conductive substrate comprises a film formed of an electrically conductive material.

11. The electrode of claim 10, wherein the film is flexible or rigid.

12. The electrode of claim 10, wherein the conductive material comprises a metal, an alloy, a polymer, graphite, or a conducting oxide.

13. The electrode of claim 9, wherein the nanostructured current collectors comprise conductive nanotubes/fibers, wherein the nanostructured current collectors are in electrical contact with the conductive substrate.

14. The electrode of claim 13, wherein the conductive nanotubes/fibers comprise carbon nanotubes (CNTs) or carbon fibers (CFs).

15. The electrode of claim 9, further comprising an electrolyte solution filled in spaces defined among the nanostructured current collectors and the nanoparticles of the active material.

16. An electrochemical cell comprising the electrode claimed in claim 9.

* * * * *